United States Patent
Tsubata et al.

[19]

[11] Patent Number: 5,926,229
[45] Date of Patent: Jul. 20, 1999

[54] DEVELOPMENT SUPPORTING METHOD AND DEVICE FOR SIGNAL PROCESSING SYSTEM AND SIGNAL PROCESSING DEVICE AND METHOD

[75] Inventors: Shintaro Tsubata; Kazuki Ninomiya; Jiro Miyake; Tamotsu Nishiyama, all of Osaka, Japan

[73] Assignee: Matsushita Electric Industrial Co., Ltd., Osaka, Japan

[21] Appl. No.: 08/544,070

[22] Filed: Oct. 17, 1995

[30] Foreign Application Priority Data

Oct. 18, 1994 [JP] Japan .................................. 6-251780

[51] Int. Cl.[6] .............................. H04N 5/46; H04N 7/08; H04N 7/084; H04N 7/087
[52] U.S. Cl. .................... 348/555; 348/556; 348/558; 348/474
[58] Field of Search .................... 348/553, 554, 348/556, 557, 555, 558, 460, 473, 474, 461, 465, 467; 370/522; H04N 5/46, 7/08, 7/084, 7/087

[56] References Cited

U.S. PATENT DOCUMENTS

| | | | |
|---|---|---|---|
| 4,953,022 | 8/1990 | Bugg | 358/147 |
| 5,083,205 | 1/1992 | Arai | 348/558 |
| 5,187,575 | 2/1993 | Lim | 358/140 |
| 5,327,243 | 7/1994 | Maietta et al. | 348/565 |
| 5,374,962 | 12/1994 | Klink | 348/557 |
| 5,400,077 | 3/1995 | Cookson | 348/445 |
| 5,555,197 | 9/1996 | Ninomiya et al. | 348/555 |
| 5,657,090 | 8/1997 | Friesen | 348/558 |

OTHER PUBLICATIONS

Maximilian Ott et al., "PicPen—A Programming Environment for Picot, a Real–Time Video Signal Processing System", Proc. of the transactions of the Institute of Television, 1990, vol. 44, No. 11, pp. 1570–1578.

*Primary Examiner*—Bryan Tung
*Assistant Examiner*—Nhon T Diep
*Attorney, Agent, or Firm*—McDermott, Will & Emery

[57] ABSTRACT

According to the signal processing method of the invention, control data is previously generated by using the name of a control signal included in an object signal, and then, the object signal including the control signal is input. The name of the control signal in the control data is substituted with the content of the control signal included in the object signal, and then the object signal is processed by a signal processing unit by using the control data including the content of the control signal. Therefore, the signal processing unit can change the processing to be performed on the object signal in accordance with the content of the control signal included in the object signal.

7 Claims, 27 Drawing Sheets

CONTROL DATA -1

```
     port_1 COUNTER
INITIAL VALUE = (47,107)ADDRESS
      INCREMENT = 1
         1 LINE = 374
LINE INCREMENT = 47
```

Fig.9 (b)

CONTROL DATA - 2

```
src = (47,107)ADDRESS
for(i=0; i<516; i++){
dst = port_1 ADDRESS
  for(j=0; j<374; j++){
    *dst=*src;
    dst++, src++;
  }
  src = src +47;
}
```

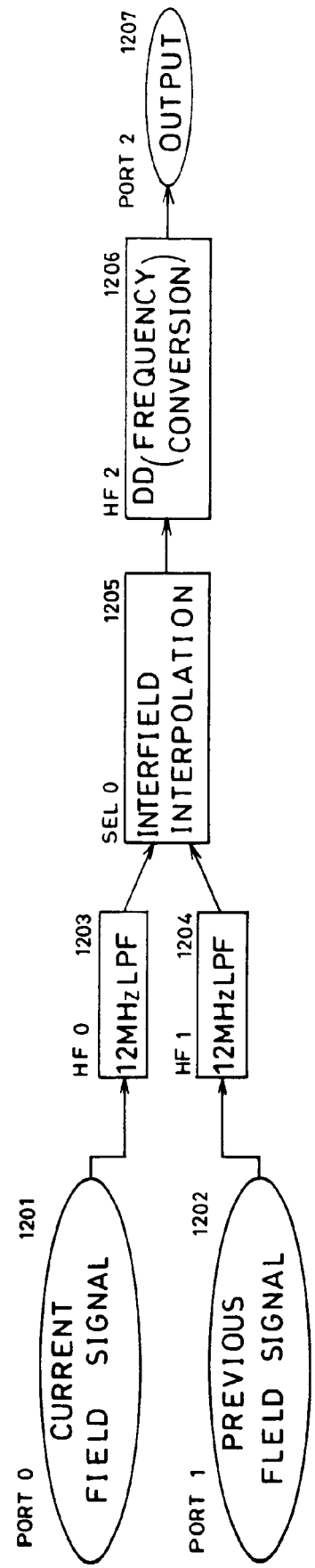

Fig.13(a)
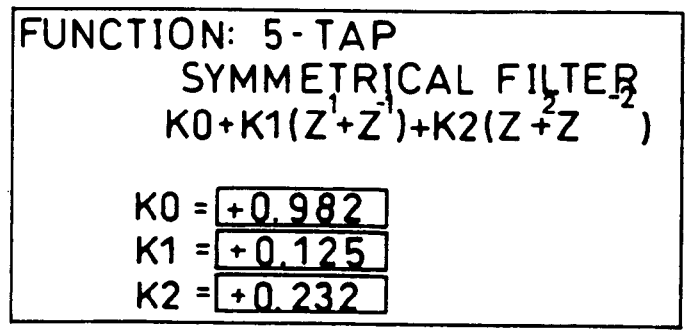
Fig.13(b)
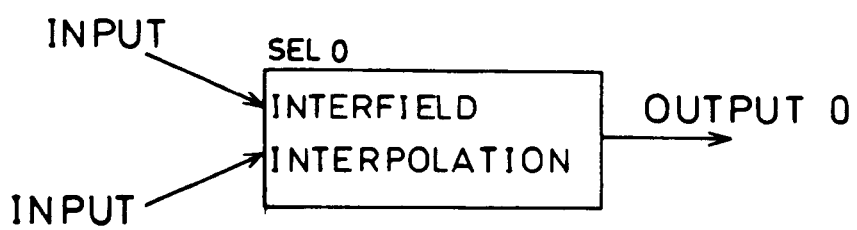

| CONTROL SIGNAL | CONTENT |
|---|---|
| FSS | SOURCE SIGNAL Ctrl [20] |
| NOTFSS | LOGICAL NOT OF FSS |
|  |  |
|  |  |

Fig.15

```
PORT0: INPUT
        signal[0]
PORT1: INPUT
        signal[-748*516]
HF0:    5TAP
        0.982,0.125,-0.232
        PORT0
HF1:    5TAP
        0.982,0.125,-0.232
        PORT1
SEL0:   INSERT_SEL
        $FSS
        HF0,HF1
HF2:    DD(2/3)
        1.09,0.849,0.312
PORT2: OUTPUT
        HF2
```

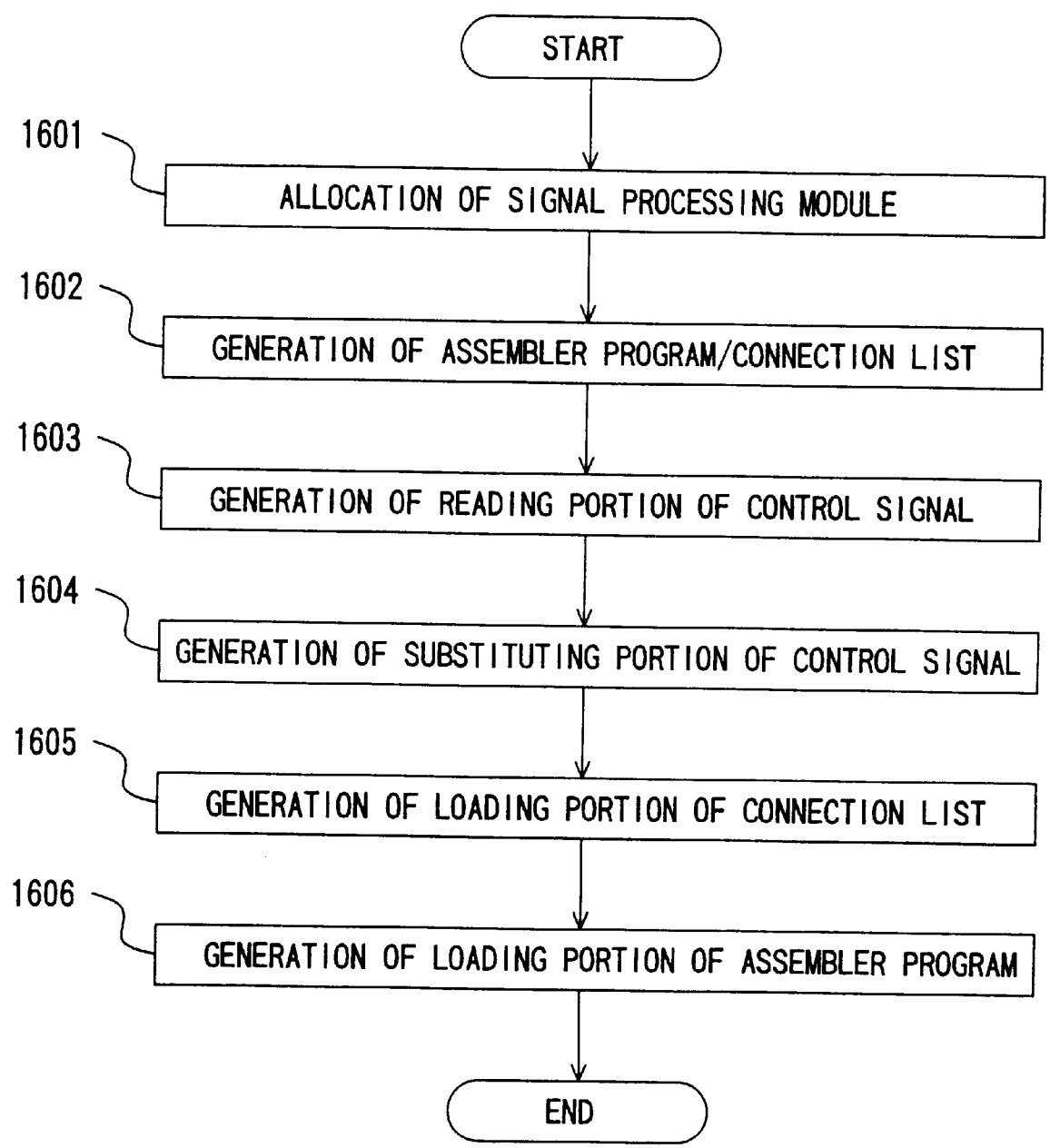

Fig.17(a)

```
PROG_HF_1:
  while (1) {
    if (CLK) {
      ld      0 , ALU
      mul -0.232  DF[1]
      mul +0.125  DF[2]
      mul +0.982  DF[3]
    }
  }
```

Fig.17(b)

```
PROG_HF_2:
  while (1) {
    if (CLK) {
      ld    DF[0], ALU
      mul +0.125  DF[2]
      mul -0.232  DF[3]
    }
  }
```

Fig.17(c)

```
PROG_SEL_T:
  while (1) {
    if (CLK) {
      ld  DF[$FSS] , ALU
    }
    if (CLK) {
      ld  DF[1-$FSS], ALU
    }
  }
```

Fig.17(d)

```
NETLIST:
  VPE1[in0]:VPE0[out0]
  VPE1[in1]:VPE0[out1]
  VPE2[in0]:VPE1[out0]
  VPE2[in1]:VPE1[out1]
  VPE3[in1]:VPE2[out1]
  VPE3[in1]:VPE4[out1]
```

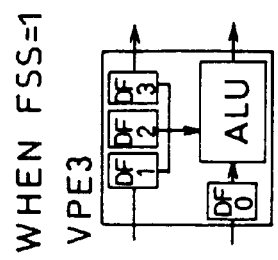
Fig.18(c) WHEN FSS=1
VPE3
PROCESSING
CLK0: OUTPUT DF1
CLK1: OUTPUT DF0
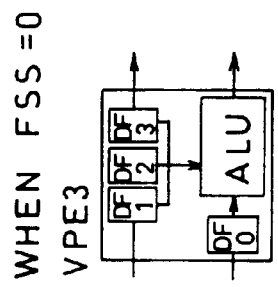
Fig.18(b) WHEN FSS=0
VPE3
PROCESSING
CLK0: OUTPUT DF0
CLK1: OUTPUT DF1
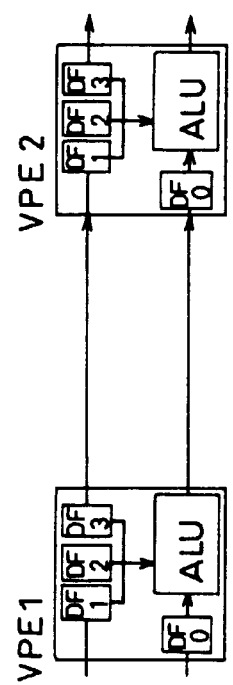
Fig.18(a)
VPE1
PROCESSING
CLK: −0.232*DF1
+0.125*DF2
+0.982*DF3
VPE2
PROCESSING
CLK: OUTPUT
+DF0
+0.125*DF2
−0.232*DF3

Fig. 19

```
1901 ──► FSS     = GetCtrlData(20);
         notFSS  = !FSS;
1902 ──► Translate(PROG_SEL_T, PROG_SEL);
         DownLoad(BUSSW, NETLIST);
         ┌ DownLoad(VPE1, PROG_HF_1);
1903 ┤   │ DownLoad(VPE2, PROG_HF_2);
         └ DownLoad(VPE3, PROG_SEL);
```

Fig. 20(a)
WHEN FSS = 0

```
PROG_SEL;
    if (CLK){
        ld   DF[0], ALU
    }
    if (CLK){
        ld   DF[1], ALU
    }
```

Fig. 20(b)
WHEN FSS = 1

```
PROG_SEL;
    if (CLK){
        ld   DF[1], ALU
    }
    if (CLK){
        ld   DF[0], ALU
    }
```

Fig.26(a)

```
PORT0: INPUT
       signal[0]
PORT1: INPUT
       signal[1]
HF0: 7TAP
     0.982, 0.125, -0.232, 0.116
     PORT0
HF1: 7TAP
     0.982, 0.125, -0.232, 0.116
     PORT1
SEL0: INSERT_SEL
      $FSS
      HF0, HF1
HF2: DD(2/3)
     1.09, 0.849, 0.312, -0.0668
PORT2: OUTPUT
       HF2
```

Fig.26(b)

```
PORT0: INPUT
       signal[0]
PORT1: INPUT
       signal[1]
HF0: 7TAP
     0.982, 0.125, -0.232, 0.116
     PORT0
HF1: 7TAP
     0.982, 0.125, -0.232, 0.116
     PORT1
HF3: DD(2/3)
     1.09, 0.849, 0.312, -0.0668
     HF0
HF4: DD(2/3)
     1.09, 0.849, 0.312, -0.0668
     HF1
SEL0: INSERT_SEL
      $FSS
      HF3, HF4
PORT2: OUTPUT
       SEL0
```

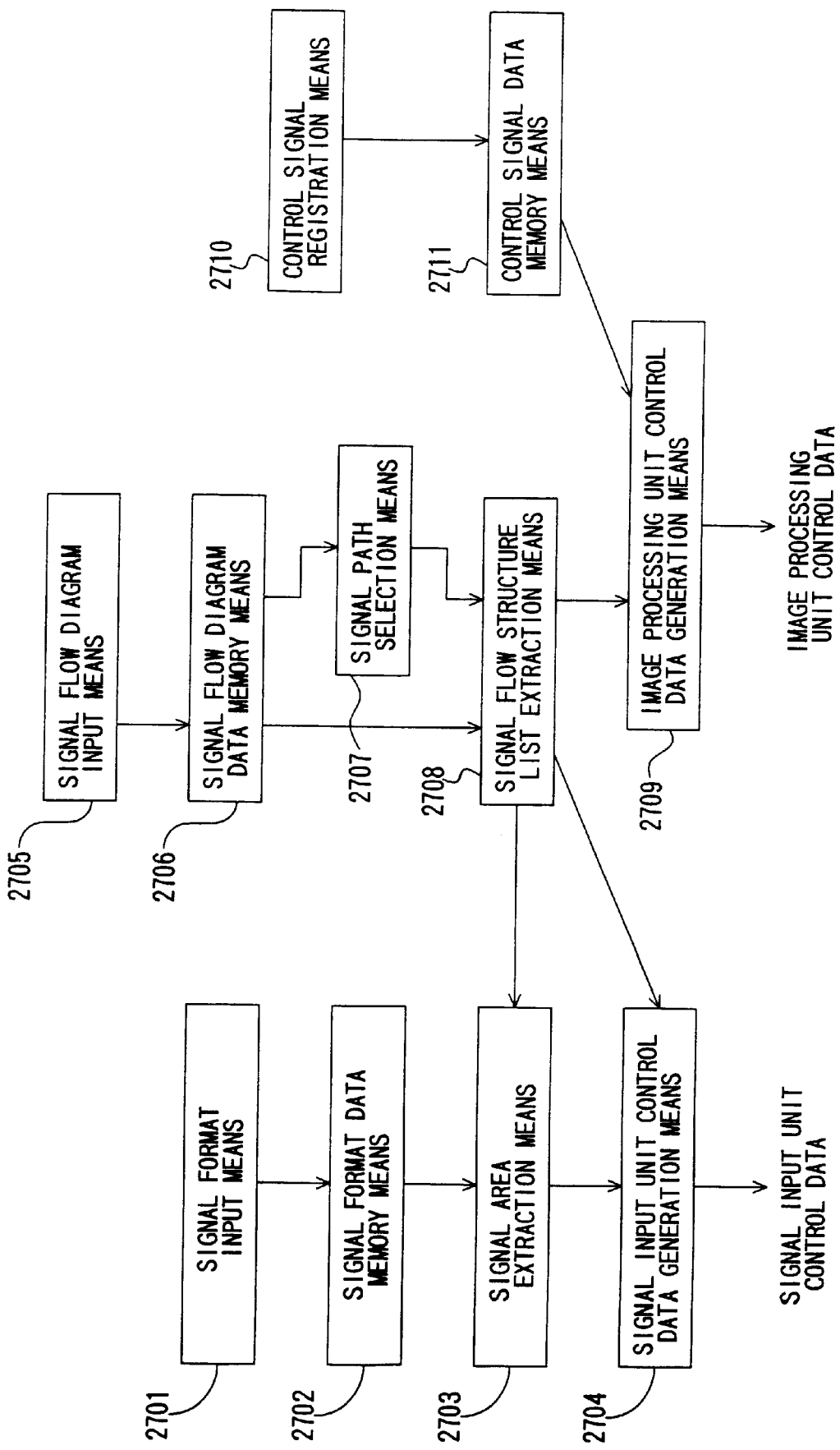

Fig.28

PORT 0 :
    (OVAL, 0, 30, 15, 35)
    (INPUT, Y, 0)
    (SOURCE_SIGNAL)

HF 0 :
    (BOX, 50, 30, 15, 35)
    (HF, 5TAP, 0.982, 0.125, -0.232)
    (PORT 0)

HF 1 :
    (BOX, 50, 80, 15, 35)
    (HF, 5TAP, 0.982, 0.125, -0.232)
    (PORT 1)

Fig. 29
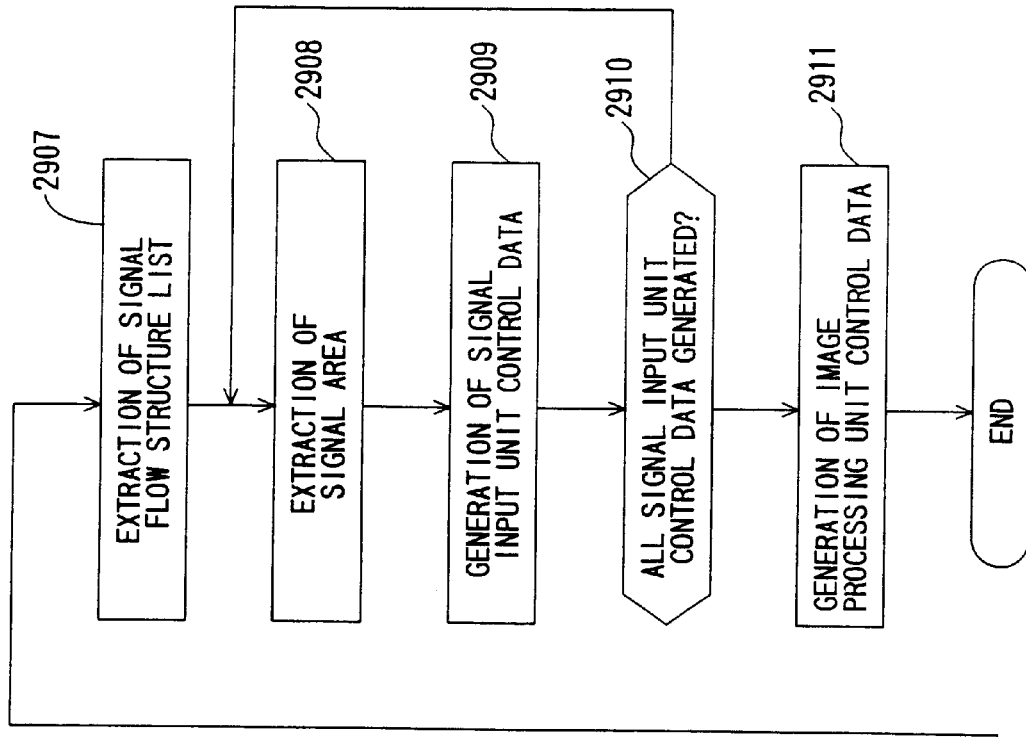
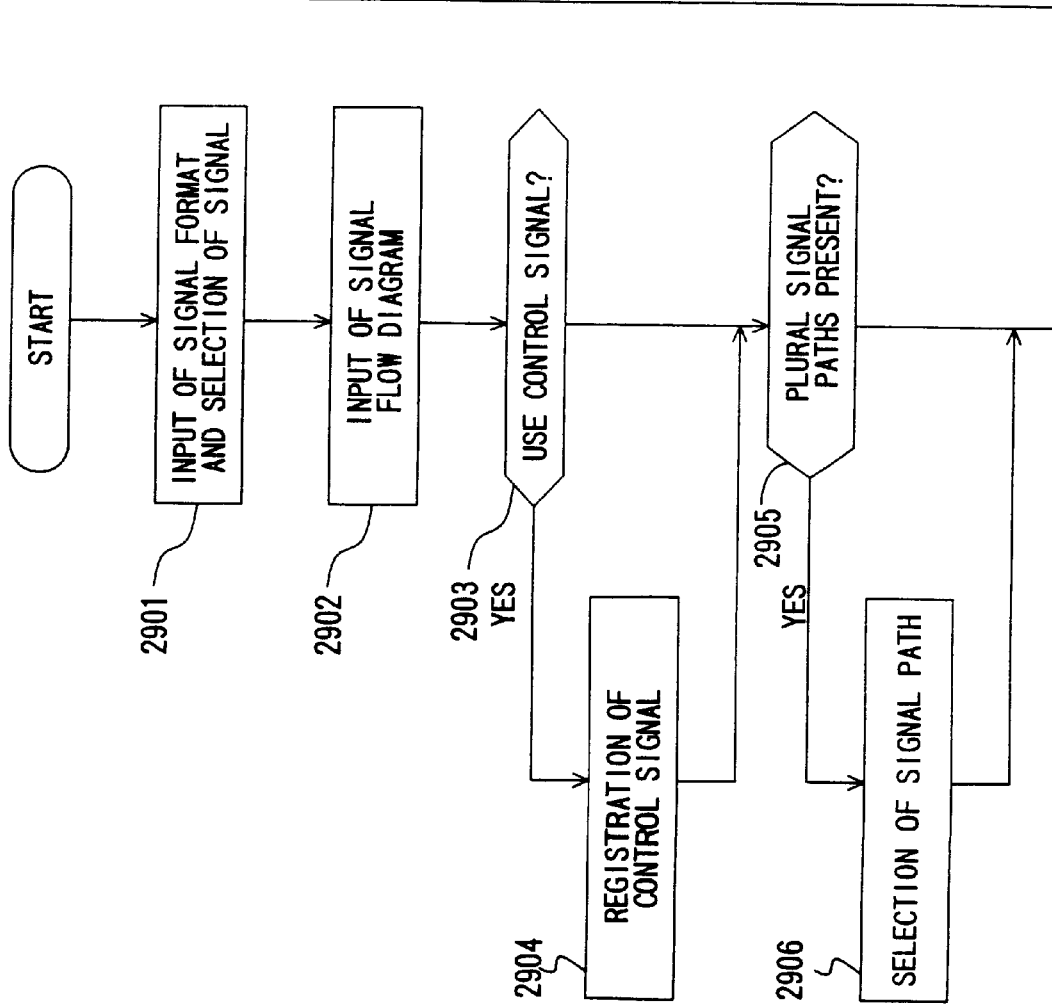

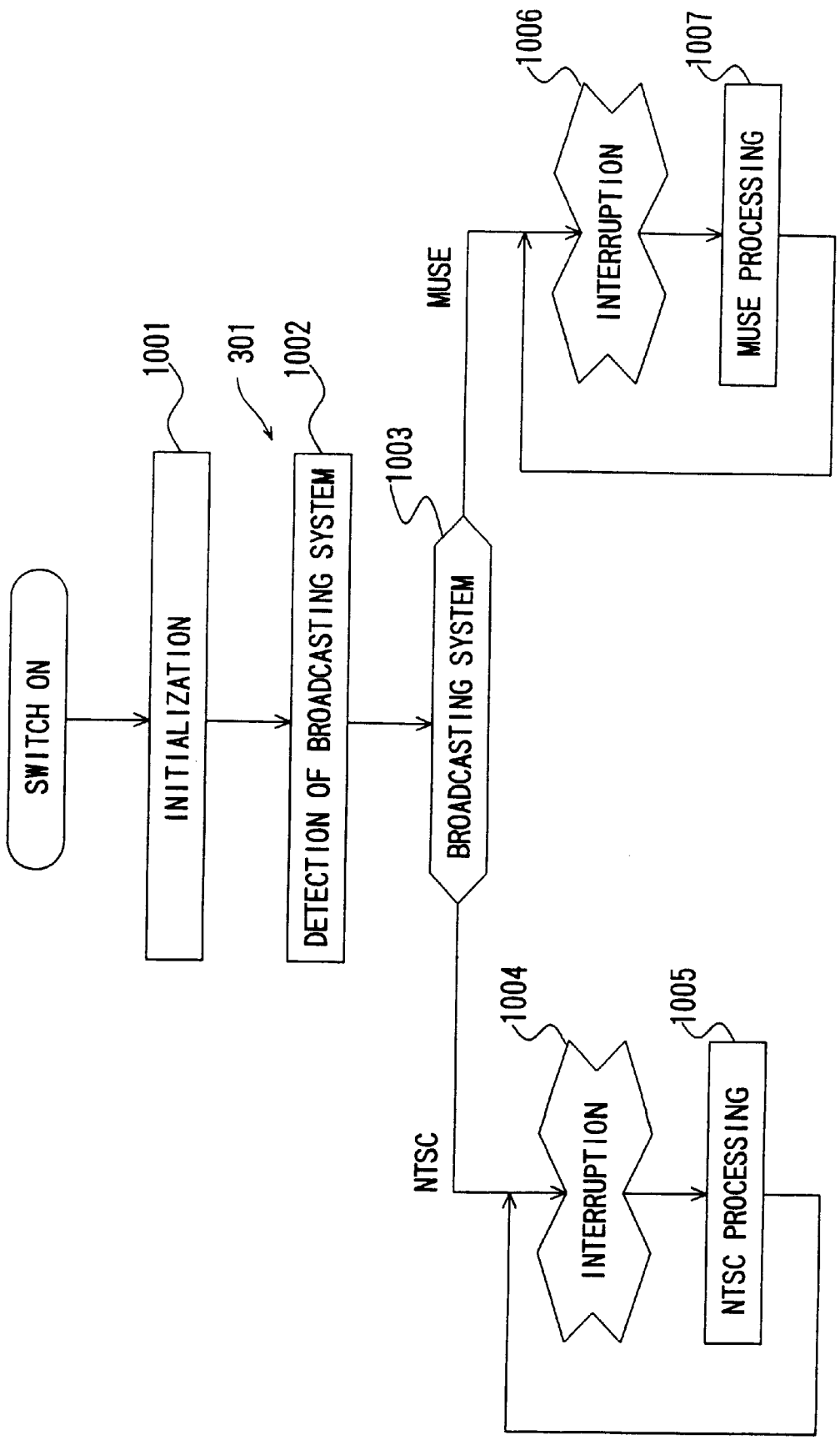

DEVELOPMENT SUPPORTING METHOD AND DEVICE FOR SIGNAL PROCESSING SYSTEM AND SIGNAL PROCESSING DEVICE AND METHOD

BACKGROUND OF THE INVENTION

The present invention relates to a development supporting method and device for developing a signal processing program to be supplied to a digital signal processor (DSP) used in a signal processing system, and a signal processing device and method using the signal processing program developed by the same.

Recently, a broadcasting system designated as EDTV (extended definition TV; so-called "clear-vision") has been practically adopted to meet demands for high definition in television images. Furthermore, novel high definition broadcast by a MUSE (multiple sub-nyquist sampling encoding) system, which is a kind of HDTV (high definition TV; so-called "hi-vision"), has been proposed and is partially practiced. In the near future, EDTV II (second-generation EDTV) and digital broadcast are planned to be practiced. In accordance with such development, it is necessary for image signal processors such as a television receiver (hereinafter referred to as the TV receiver) and a video tape recorder (hereinafter referred to as the VTR) to cope with a plurality of broadcasting systems including the currently adopted NTSC (national television system committee) system. As a countermeasure, for example, a plurality of boards respectively corresponding to a plurality of broadcasting systems are built in a TV receiver so that a board to be used is selected in accordance with the broadcasting system of a signal to be received.

Such a conventional TV receiver, however, disadvantageously costs much because a plurality of boards are built in.

The present applicant therefore proposed an image signal processor with a low cost in Japanese Patent Application No. 5-84712 (US patent application Ser. No. 8/226,663). In this image signal processor, hardware is commonly used for a plurality of broadcasting systems, and the processing by the common hardware is conducted differently in the respective broadcasting systems by switching software to be used. As a result, image signals of different broadcasting systems can be appropriately processed.

When a signal to be processed is an image signal as in the aforementioned case, the image signal includes a control signal such as an interfield subsampling phasing signal. The content of the signal processing by the common hardware (signal processing unit) is required to be changed depending upon the content of the control signal.

As more and more signal processing systems recently include a DSP, a variety of development supporting methods and development supporting devices for supporting the development of a control program for a DSP or parameters for controlling a DSP (hereinafter referred to as the control data) to be used in the development of applications for the systems are proposed. For example, such methods and devices are disclosed in "PicPEn—A Programming Environment for Picot, a Real-Time Video Signal Processing System" (Television institute magazine), Vol. 44, No. 11, pp. 1570–1578) and Japanese Laid-Open Patent Publication No. 4-274518 titled as "Programming device for an image signal processing by DSP".

However, image signals and the like are input in accordance with a predetermined format in which image data and a control signal are located in a predetermined order, and hence, a developer for control data is required to sufficiently comprehend the format to generate the control data for a signal input unit for receiving an image signal. In the aforementioned development supporting methods and devices, signals composed of data alone are to be processed, and there is no description of the generation of control data used in a signal processing system for an image signal having a predetermined format.

Additionally, since the signals to be processed by the conventional development supporting methods and devices are composed of data alone and include no control signal, the application of these development supporting methods and devices cannot generate control data that can change signal processing by a signal processing unit in accordance with the content of a control signal contained in an image signal.

Moreover, although it is necessary to examine and evaluate a plurality of algorithm in order to generate appropriate control data, the aforementioned development supporting methods and devices can neither deal with nor examine various algorithm.

SUMMARY OF THE INVENTION

One objective of the invention is providing a development supporting method and device by which control data for a signal input unit can be automatically generated with ease merely by inputting a format of an object signal as a diagram by a designer.

Another objective of the invention is providing a development supporting method and device for easily generating control data which can instruct signal processing of an object signal including a control signal in accordance with the content of the control signal.

Still another objective of the invention is providing a development supporting method and device which can manage a plurality of algorithm for a signal processing application and can easily examine and evaluate these algorithm.

Still another objective of the invention is providing a signal processing device and method for signal processing using control data for instructing signal processing in accordance with the content of a control signal.

In order to attain the above-described objectives, the format of an object signal is input as a diagram by a designer in this invention.

According to the invention, the function of a signal processing unit is described by using the name of a control signal, and when an object signal including the control signal is input, the name of the control signal in the description of the function is replaced with an actual value of the control signal.

Furthermore, according to the invention, optional one of a plurality of signal processing algorithm can be selected, and examining record of the plural algorithm is retained.

Specifically, the development supporting method of the invention for developing control data used in a signal processing system that conducts predetermined signal processing in accordance with the control data comprises a signal format input step for inputting a format of an object signal including a plurality of signals; a selection step for selecting part of or all the signals included in the object signal; a signal area extraction step for extracting data of a signal area occupied by the signal selected in the selection step in the format input in the signal format input step; and an input unit control data generation step for generating control data for an input unit of the signal processing system on the basis of the data of the signal area extracted in the signal area extraction step.

In another aspect of the invention, the development supporting method of the invention for developing control data used in a signal processing system that conducts predetermined signal processing in accordance with the control data comprises a function input step for inputting function data of a signal processing unit of the signal processing system which is described by using a name of a control signal included in an object signal; a registration step for registering derivation data of a content of the control signal; and a signal processing unit control data generation step for generating control data for the signal processing unit on the basis of the function data input in the function input step and the derivation data of the content of the control signal registered in the registration step.

In still another aspect of the invention, the development supporting method of the invention for developing control data used in a signal processing system that conducts predetermined signal processing in accordance with the control data comprises a flow input step for inputting algorithm for the signal processing and functions of a plurality of signal processing units used for the signal processing as a flow diagram which shows flow of an object signal and includes plural signal paths between predetermined two of the signal processing units; a path selection step for selecting one of the plural signal paths between the predetermined two signal processing units; a structure data extraction step for extracting structure data from the signal flow diagram input in the flow input step excluding the signal paths that are not selected in the path selection step; and a signal processing unit control data generation step for generating control data for the signal processing units on the basis of the structure data extracted in the structure data extraction step.

Additionally, the invention provides a development supporting device used for any of the aforementioned development supporting methods.

Furthermore, the signal processing method of the invention comprises steps of previously generating control data by using a name of a control signal included in an object signal; inputting the object signal including the control signal; substituting the name of the control signal included in the control data with a content of the control signal included in the object signal; and processing the object signal by using the control data including the content of the control signal.

In addition, the invention provides a signal processing device used for the signal processing method.

Accordingly, in the present invention, a signal format of an object signal is input as a diagram and stored, and when a designer selects one of signals included in the object signal, signal area data of the selected signal in the format of the object signal is extracted. Then, control data for a signal input unit is generated on the basis of the area data of the selected signal. As a result, the designer can generate control data for the signal input unit with ease without remembering or repeatedly retrieving detailed knowledge and information on the control of the signal input unit.

Alternatively, in the present invention, a designer inputs function data of a signal processing unit by using a name of a control signal and registers a derivation method for a content (an actual value) of the control signal. When an object signal including the control signal is input, the content of the control signal included in the object signal is replaced with the name of the control signal in the function data of the signal processing unit. As a result, control data for the signal processing unit can be generated with ease.

Alternatively, in the present invention, a designer inputs a signal flow diagram, and selects optional one of plural signal paths present between two predetermined signal processing units in the signal flow diagram. Structure data is extracted from a signal flow diagram resulting from the selection of the signal path, and control data for the signal processing unit is generated on the basis of the extracted structure data. Therefore, when the selection of optional one of the signal paths, the extraction of structure data and the generation of control data are successively repeated, record of algorithm for the signal processing application remains, which makes it easier to examine the algorithm and develop appropriate control data after the examination.

In addition, in the signal processing device and method of the invention, when an object signal including a control signal is input, the name of the control signal in the control data is replaced with the content of the control signal, and then, the control data including the content of the control signal is output to the signal processing unit. Therefore, the signal processing unit can change its signal processing in accordance with the content of the control signal included in the object signal.

The above and further objects and features of the invention will more fully be apparent from the following detailed description with accompanying drawings.

BRIEF DESCRIPTION OF THE DRAWINGS

FIG. 9a shows an example of generated control data for the signal input unit, and FIG. 9b shows another example of the generated control data for the signal input unit;

FIG. 12 is an exemplified signal flow diagram used in the development supporting system for a signal processing system according to Embodiment 2 of the invention;

FIG. 13a shows an example of function selection description of a low-pass filter block, and FIG. 13b shows an example of function selection description including an image control signal of an interfield interpolation block;

FIG. 14 shows an example of image control signal data;

FIG. 15 shows an example of a signal flow structure list;

FIG. 16 is a flowchart for detailed processing in step 1004 of FIG. 10;

FIG. 17a shows an example of a generated assembler program, FIG. 17b shows an example of the generated assembler program including an image control signal, FIG. 17c shows another example of the generated assembler program and FIG. 17d shows an example of a generated connection list;

FIG. 18a is an explanatory diagram of the operation of a low-pass filter signal processing module using the generated assembler program, FIG. 18b is an explanatory diagram of the operation of an interfield interpolation signal processing module when an image control signal has a predetermined value, and FIG. 18c is an explanatory diagram of the operation of the interfield interpolation signal processing module when the image signal has another predetermined value;

FIG. 19 shows an example of a generated control program for a signal processing unit;

FIG. 20a shows an example of an assembler program obtained by substituting a value of an image control signal, and FIG. 20b shows another example of the assembler program obtained by substituting a value of an image control signal;

FIG. 26a shows a signal flow structure list extracted from the signal flow diagram of FIG. 25a, and FIG. 26b shows a signal flow structure list extracted from the signal flow diagram of FIG. 25b;

FIG. 27 is a functional block diagram of a development supporting device for a signal processing system according to Embodiment 5 of the invention;

FIG. 28 shows an example of signal flow diagram data;

FIG. 29 is a flowchart for the outline of the operation by the hardware configuration of the program development supporting system for a signal processing system of FIG. 4; and FIG. 30 is a flowchart for the detection of a broadcasting system in a TV receiver and the switching of signal processing in accordance with the detection result.

DETAILED DESCRIPTION OF THE INVENTION

The present invention will now be described by way of examples referring to the accompanying drawings.

The hardware configuration of an image (signal) processing system to be exemplified in the following embodiments will be first described.

In the following description, an image signal to be input to the signal processing system is referred to as a source signal (an object signal), and a signal to be output as a result of the processing by the signal processing system is referred to as an output signal.

Figure 1:
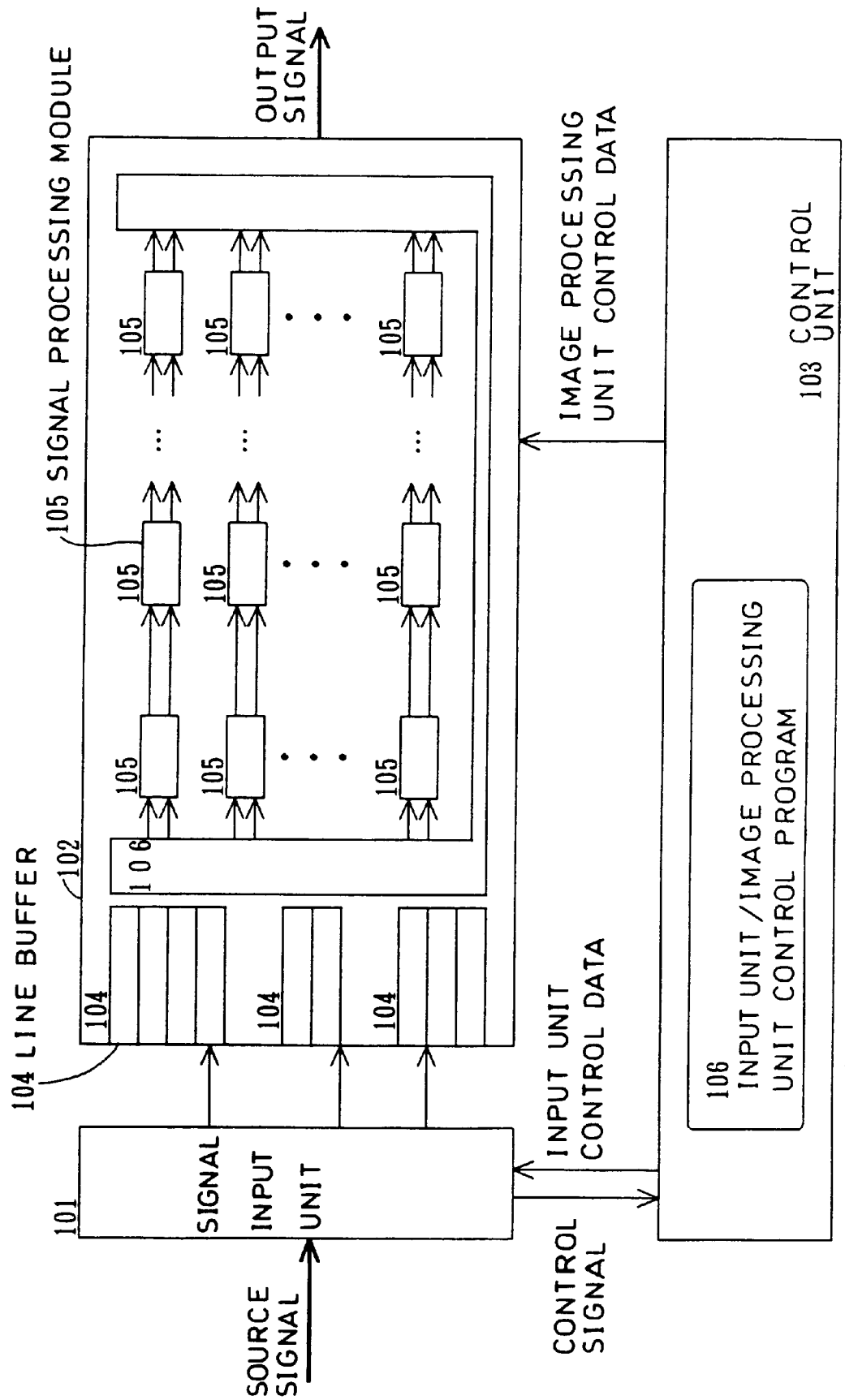
FIG. 1 is a functional block diagram showing the hardware configuration of a signal processing system according to preferred embodiments of the invention.

FIG. 1 shows an exemplified configuration of a signal processing system using a DSP.

The image signal processing system of FIG. 1 comprises a signal input unit 101, through which a source signal is input to an image processing unit 102. The source signal includes a luminance signal, a color signal and a speech signal as well as image control signals such as a subsampling phasing signal.

The image signal processing unit 102 executes various types of image signal processing algorithm.

The system further comprises a control unit 103 including a control program 106 for controlling the signal input unit 101 and the image processing unit 102. The control program 106 comprises a plurality of control programs which respectively correspond to a plurality of broadcasting systems such as the NTSC system and the MUSE system. One of the control programs is transferred (down loaded) to the signal input unit 101 and respective signal processing modules 105 (described in detail below) in the image processing unit 102. The control unit 103 controls the signal input unit 101 and the image processing unit 102 field by field, and the content of signal processing in each field can be changed under control of the control unit 103.

The image processing unit 102 comprises a plurality of line buffers 104 for receiving a signal from the signal input unit 101 and a plurality of signal processing modules (signal processing units) 105 for executing image processing. The number of the signal processing modules 105 depends upon the kind of objective image processing to be conducted, and is, for example, approximately seventy.

The image processing unit 102 further comprises a bus switch 106 for connecting the line buffers 104 with the signal processing modules 105.

FIG. 30 is a flowchart for the control operation conducted by the control unit 103 working as a control unit in a TV receiver. When the switch of the TV receiver is turned on, an operation part and registers (not shown) built in the control unit 103 are reset to be initialized (step 1001). Then, a broadcasting system is detected (step 1002) (this step 1002 forms system detection means 301). When the broadcasting system is detected to be the NTSC system, the procedure is branched to NTSC processing (step 1005) in which a control program corresponding to the NTSC system is selected to be transferred (down loaded) to the signal processing modules 105. When the broadcasting system is the MUSE system, the procedure proceeds to MUSE processing (step 1007) in which a control program corresponding to the MUSE system is selected to be transferred (down loaded) to the signal processing modules 105. The procedure thereafter proceeds as an infinite loop, and the image processing is continuously conducted until an interruption signal is input. When a demand for switching the image processing (i.e., a channel changing demand in the TV receiver) occurs during the NTSC processing (step 1005), an interrupt is generated (step 1004) and the procedure returns to the detection of the broadcasting system (step 1002). Similarly, when a demand for switching the image processing occurs during the MUSE processing (step 1007), an interrupt is generated (step 1006).

Figure 2:
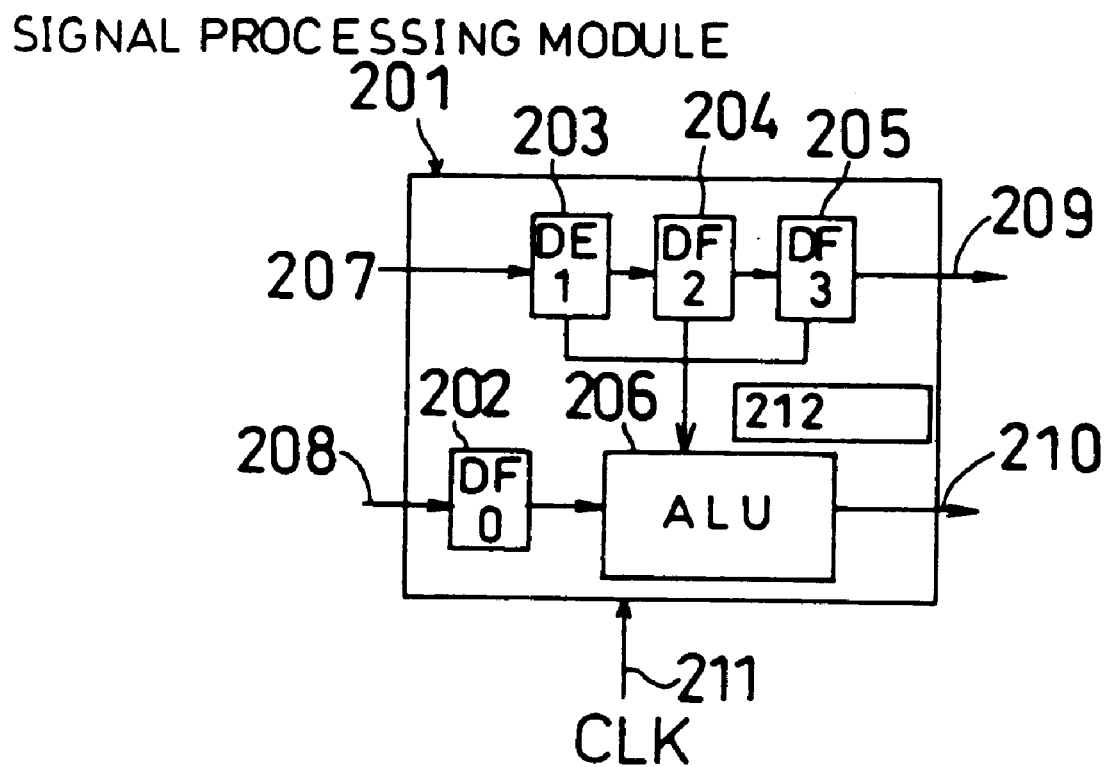
FIG. 2 is a functional block diagram of a signal processing module of FIG. 1.

FIG. 2 shows an example of the configuration of the signal processing modules 105.

As is shown in FIG. 2, a signal processing module 201 is operated in response to an external clock signal 211. The signal processing module 201 has two lines of inputs 207 and 208 and two lines of outputs 209 and 210.

The signal processing module 201 comprises an internal register 202 for receiving and storing data from the input 208, and another internal register 203 for receiving and storing data from the input 207.

The signal processing module 201 further comprises an internal register 204 for receiving and storing data from the internal register 203, and still another internal register 205 for receiving and storing data from the internal register 204. The signal processing module 201 further comprises an arithmetic logic unit (ALU) 206 for receiving and operating data from the internal registers 202, 203, 204 and 205. The operation includes addition, substraction, multiplication, division and comparison. The result of the operation is output as the output 210.

Data in the internal register 205 is output as the output 209.

The signal processing module 201 further comprises a program storage 212 for storing a program for controlling the signal processing module 201. The stored program is transferred (down loaded) from the control unit 103.

The signal processing module 201 is controlled by an assembler program stored in the program storage 212 so as to execute signal processing. Specifically, the assembler program indicated by a program counter (not shown) is sequentially read to be executed until the end of the assembler program. When the assembler program is finished to be read, the program is repeatedly read from the beginning.

When an image signal includes a variety of image control signals such as a subsampling phasing signal, it is necessary to change the content of the image processing depending upon the values of the image control signals. Such an image control signal is generally provided to each field. Additionally, the image signal can include signals derived from the image control signals such as a logical NOT signal.

Both the image control signals and the signals derived therefrom are herein treated as the image control signals.

The control unit 103 controls the signal input unit 101 and the image processing unit 102 in a field-by-field manner as described above, and hence, it is possible to control the processing of the signal input unit 101 and the image processing unit 102 in accordance with the image control signals.

Figure 3:
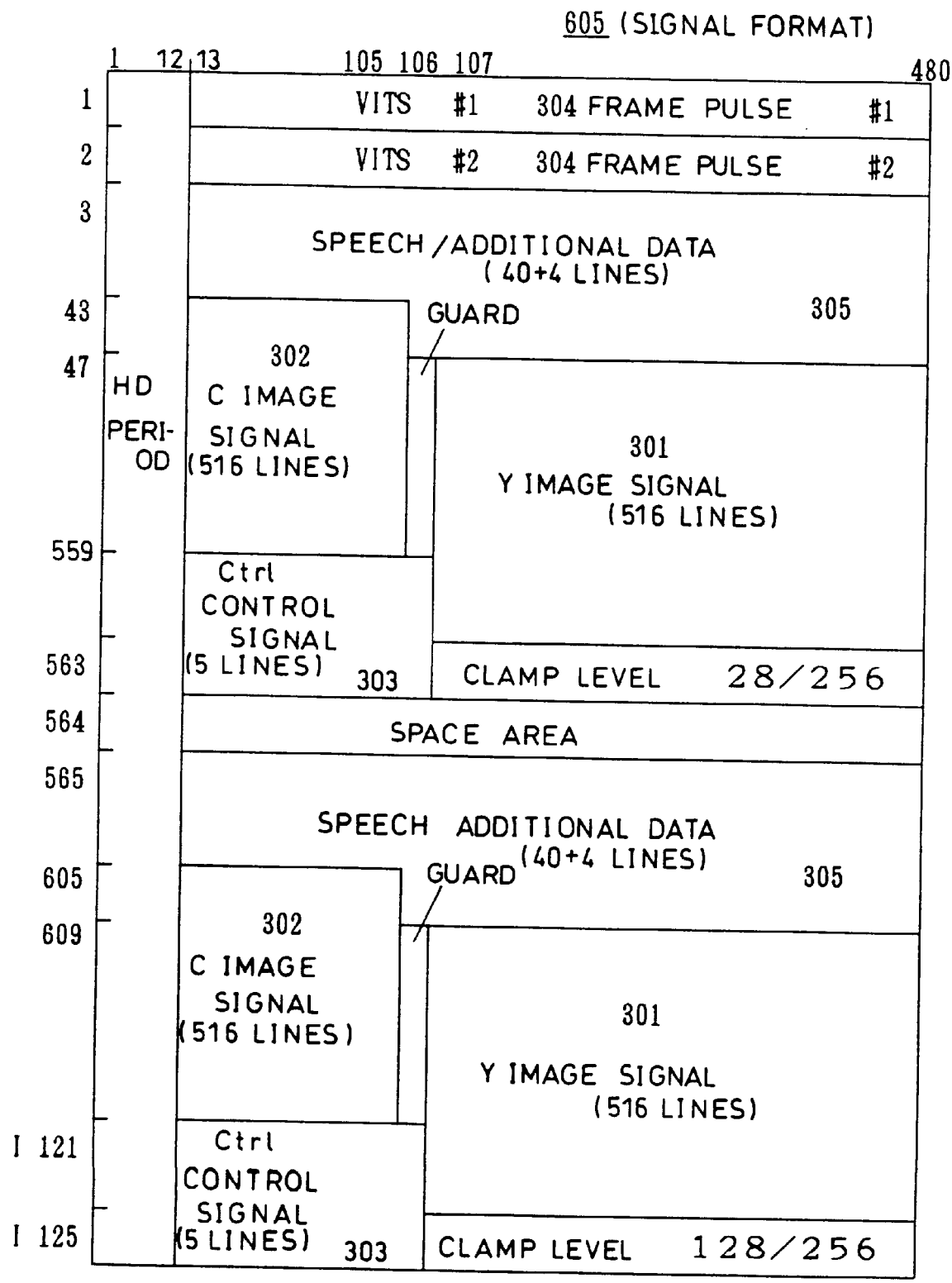
FIG. 3 is an explanatory diagram of a format of an image signal used in the preferred embodiments of the invention.

In the following embodiments, an image signal having a signal format as is shown in FIG. 3 will be exemplified.

The image signal of FIG. 3 includes 480 pixels by 565 lines in one field.

Actually, pixels (1,1), (1,2), . . . , (1, 480), (2, 1), . . . , (2, 480), . . . , (565, 1), . . . , and (565, 480) are successively transmitted and received to be stored in a storage unit 404. Alternatively, the pixels can be read from a recording medium such as a disk to be stored in memory means of the present system. It is possible to fetch the image signal directly from a receiving unit without storing it in the memory means. In this case, the position of each pixel is defined by the time at which the pixel is fetched.

Now, the data structure of the signal format of the image signal of FIG. 3 will be described. In this description, a pixel positioned in the ath line and the bth column is indicated as (a, b). A luminance signal 301 is shown as a Y image signal starting from (47, 107). A color signal 302 is shown as a C image signal starting from (43, 3). An image control signal 303 is shown as a image control signal Ctrl starting from (559, 3). Frame pulses 304 are interpolated in the first and second lines for the vertical synchronization of each frame. Speech data and additional data 305 follows the frame pulses 304.

(Embodiment 1)

Figure 4:
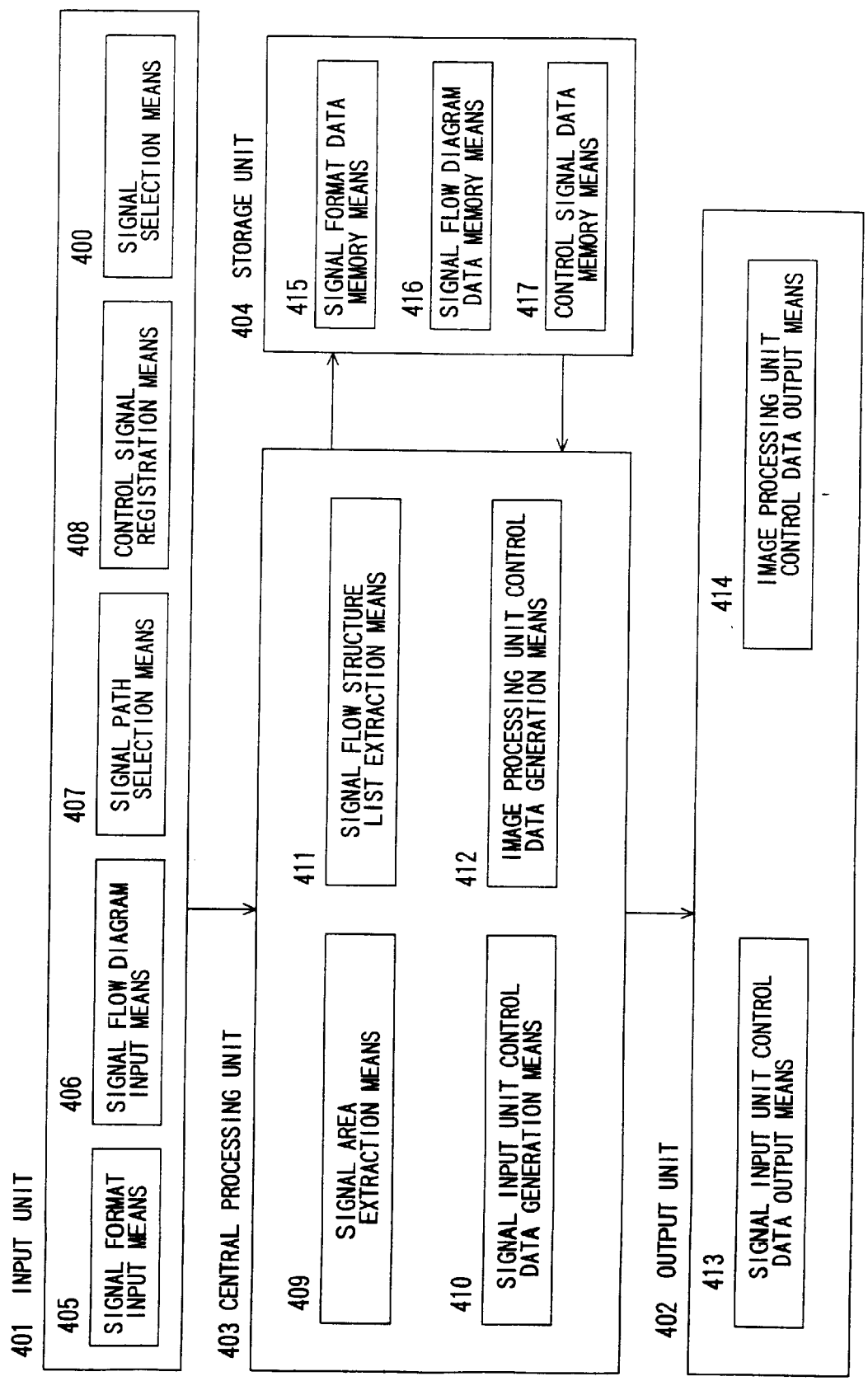
FIG. 4 is a block diagram showing the hardware configuration of a development supporting system for a signal processing system according to Embodiment 1 of the invention.

FIG. 4 shows the hardware configuration of a program development supporting system for an image processing system using a DSP.

This system comprises an input unit 401, an output unit 402, a central processing unit 403 and a storage unit 404, whose configuration will now be outlined.

Figure 24:
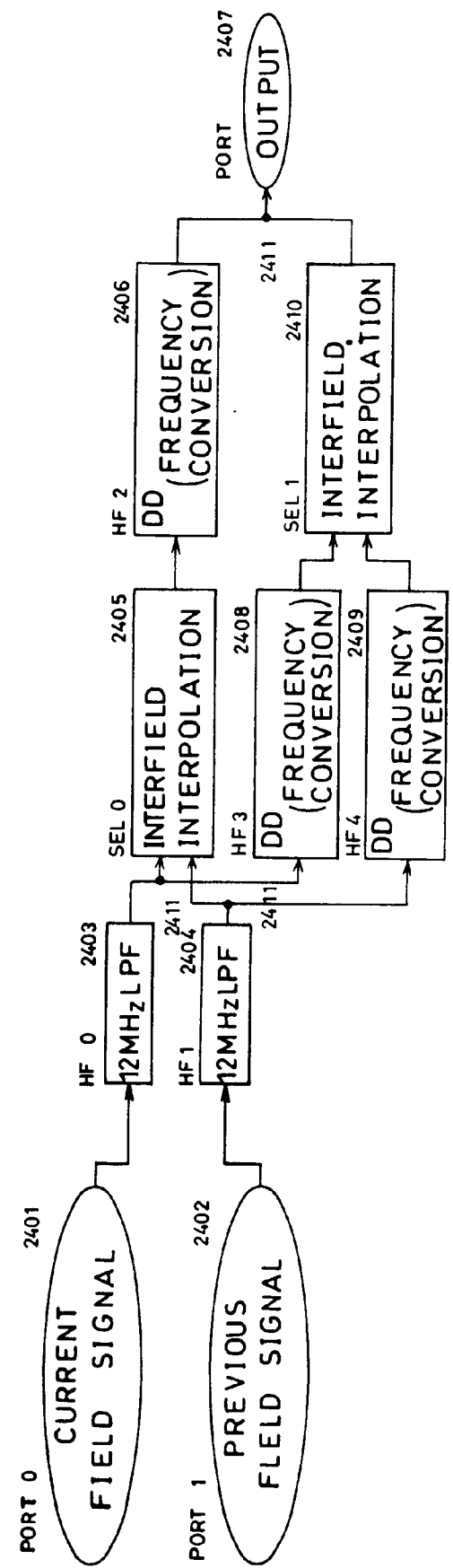
FIG. 24 is an exemplified signal flow diagram including a plurality of signal paths.

The input unit 401 is constructed as a pointing device such as a mouse, a keyboard and the like, through which a person who designs and develops a program for a DSP (hereinafter referred to as the designer) inputs algorithm/functions of a signal processing application and the format of an input signal. The input unit 401 comprises signal format input means 405 by which the designer inputs the signal format of an image signal as is shown in FIG. 3, signal flow diagram input means (flow input means) 406 by which the designer inputs a signal flow diagram as is shown in FIG. 12 or FIG. 24, signal path selection means (path selection means) 407 by which the designer selects optional one of a plurality of signal paths when the signal flow diagram of FIG. 24, i.e., a signal flow diagram in which a plurality of signal paths are formed between two signal processing units, is used, control signal registration means (registration means) 408 by which the designer registers a derivation method for a control signal when an image signal to be input includes a control signal, and signal selection means (selection means) 400 by which the designer optionally selects part, i.e., a C signal or a Y signal, or all of the signals included in the image signal (i.e., an object signal) to be input as well as specifies an input port to which the selected signal is to be supplied.

The storage unit 404 comprises signal format data memory means (format memory means) 415 for storing data on the signal format supplied to the signal format input means 401, signal flow diagram data memory means 416 for storing data on the signal flow diagram supplied to the signal flow diagram input means 406, and control signal data memory means 417 for storing the derivation method for a control signal registered in the control signal registration means 408.

The central processing unit 403 comprises signal area extraction means 409 for extracting data on a signal area occupied by the signal selected by the signal selection means 400 in the format of the image signal supplied to the signal format input means 405, signal input unit control data generation means 410 for generating control data for the signal input unit 101 of FIG. 1 on the basis of the data on the signal area extracted by the signal area extraction means 409, signal flow structure list extraction means (structure data extraction means) 411 for extracting structure data from the signal flow diagram supplied to the signal flow diagram input means 406, and image processing unit control data generation means (signal processing unit control data generation means) 412 for generating control data for the signal processing modules 105 of FIG. 1 on the basis of the structure data extracted by the signal flow structure list extraction means 411 and the derivation data of the control signal registered in the control signal registration means 408.

The output unit 402 comprises a display device such as a CRT as well as signal input unit control data output means 413 for outputting the control data and the like for the signal input unit 101 generated by the signal input unit control data generation means 410, and image processing unit control data output means 414 for outputting the control data and the like for the signal processing modules 105 generated by the image processing unit control data generation means 412. These control data, the data input by the designer and the results of the processing are displayed on the CRT.

The operation of the hardware in the program development supporting system for a signal processing system shown in FIG. 4 will now be described referring to FIG. 29.

As is shown in FIG. 29, the designer inputs the signal format of an image signal through the signal format input means 405 in step 2901. The data on the signal format of the image signal is stored in the signal format data memory means 415, and the designer selects an optional signal (such as a Y signal) included in the image signal through the signal selection means 400. In step 2902, the designer inputs the signal flow diagram shown in FIG. 12 or FIG. 24 through the signal flow diagram input means 406, and the data on the signal flow diagram is stored in the signal flow diagram data memory means 416.

Then in step 2903, it is determined whether or not a control signal included in the image signal is used for the signal processing by the signal processing modules 105. When the control signal is used, the designer registers the derivation method for the control signal through the control signal input means 408 in step 2904, and the data on the control signal is stored in the control signal data memory means 417.

In step 2905, it is determined whether or not the signal flow diagram input in step 2905 includes a plurality of signal paths. When the signal flow includes a plurality of signal paths, i.e., when the signal flow diagram of FIG. 24 is input, the designer selects optional one of the plural signal paths through the signal path selection means 407 in step 2906.

In step 2907, the signal flow structure list extraction means 411 of the central processing unit 403 extracts the structure list of the input signal flow diagram. Then, the signal area extraction means 409 extracts the signal area occupied by the selected signal (for example, the Y signal) included in the image signal in the signal format in step 2908, and the signal input unit control data generation means 410 generates control data and the like for the signal input unit 101 of FIG. 1 in step 2909. In step 2910, it is determined whether or not the control data for the signal input unit 101 on all the selected signals are generated. When all the control data are not generated, the procedure returns to steps 2908 and 2909, so as to generate the control data for the signal input unit 101 on all the selected signals.

At the end of the procedure in step 2911, the image processing unit control data generation means 412 generates the control data for the signal processing modules 105 on the basis of the extracted structure data of the signal flow diagram and the registered derivation data of the control signal, and the control data are displayed on the CRT. Thus, the procedure is completed.

Now, the processing by a development supporting system for the signal input unit 101 will be described referring to a flowchart of FIG. 5.

In step 501 (a signal format input step), the designer inputs the format of a source signal as a diagram. A signal with the format of FIG. 3 will be herein exemplified.

Figures 6, 7:
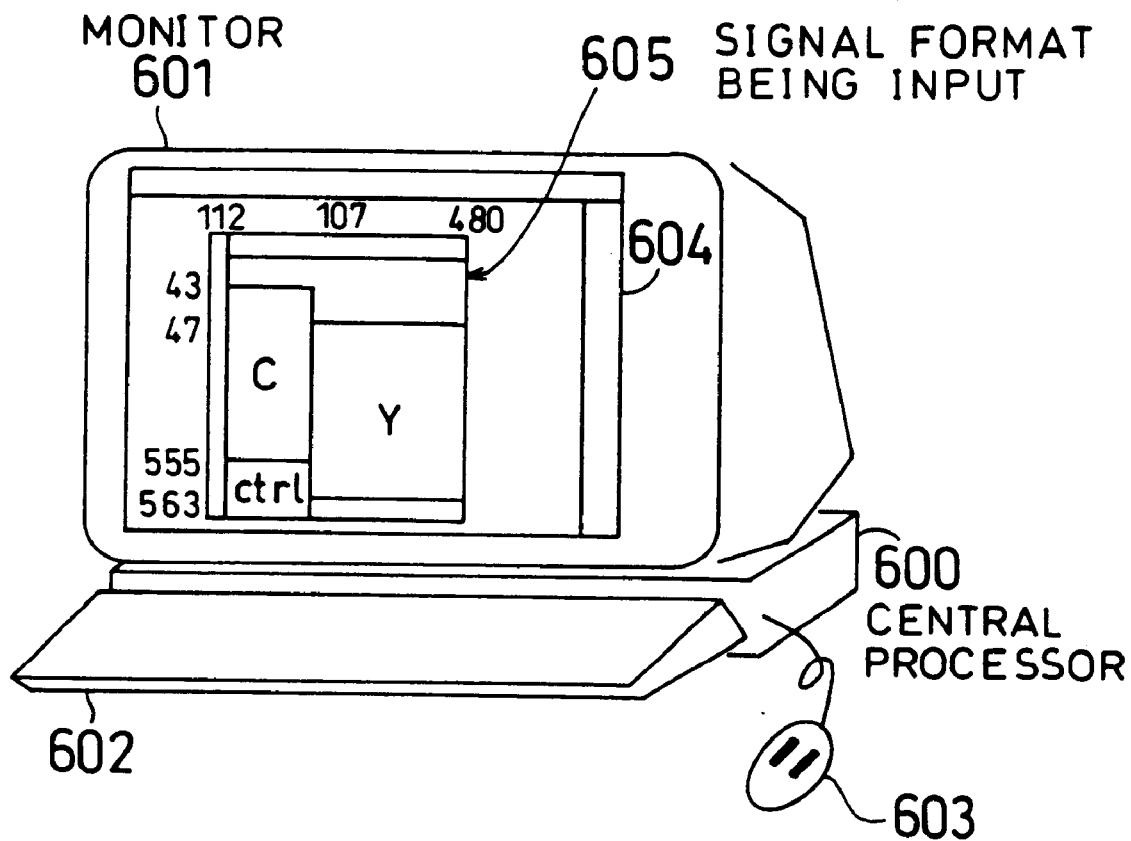
FIG. 6 is an explanatory diagram of the hardware configuration of the development supporting system for a signal input unit according to Embodiment 1 of the invention.
FIG. 7 shows exemplified signal format data used in the hardware configuration of the development supporting system for a signal input unit according to Embodiment 1 of the invention.

The designer inputs the signal format by using a signal format input editor 604 as shown in FIG. 6.

The device shown in FIG. 6 comprises a central processor 600, a monitor 601, a keyboard 602 and a mouse 603. The monitor 601 displays an execution screen of the signal format input editor 604, in which a signal format 605 of an image signal now being input is displayed.

The signal format of the image signal having been input is stored in the storage unit 404.

FIG. 7 shows exemplified data structure of the signal format of the input image signal. In FIG. 7, "Y" and "C" denotes the names of the signals, and "Y:(47, 107)–(562, 480)" means that a Y signal has a rectangular area with a diagonal line extending between apexes (47, 107) and (562, 480). Similarly, "C:(43, 13)–(558, 106)" means that a C signal has a rectangular area with a diagonal line extending between apexes (43, 13) and (558, 106).

Figure 5:
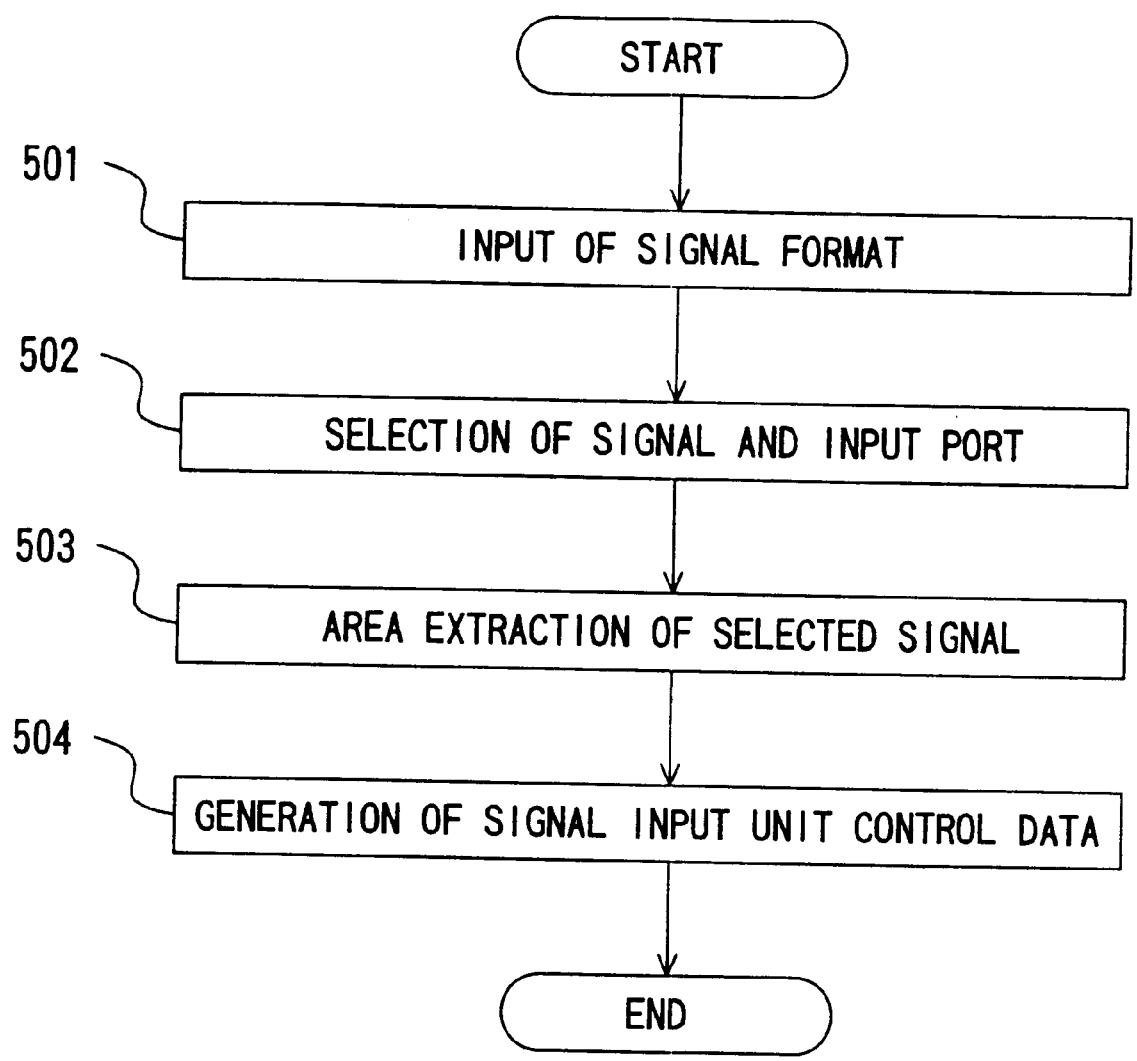
FIG. 5 is a flowchart for a main routine of a development supporting system for a signal input unit according to Embodiment 1 of the invention.

In step 502 (selection step) in the flowchart of FIG. 5, the designer selects one control signal to be input to the input unit. For example, a pointer cursor is moved to an area on the screen of the monitor 601 occupied by the Y signal by using the mouse 603. In this area, the mouse button is clicked so as to select the Y signal, and the line buffer 104 through which the selected Y signal is to be input from the signal input unit 101 is also selected. It is also possible to select the Y signal by inputting the name of the signal, "Y".

Then, in step 503 (signal area extraction step), the data on the signal area occupied by the selected Y signal in the signal format of FIG. 3 is extracted from the storage unit 404. When the Y signal is selected, the data shown in the first line of FIG. 7 is extracted. In this embodiment, the Y signal occupies the rectangular area (47, 107)–(562, 480) in the source image signal.

In step 504 (signal input unit control data generation step), control data for the signal input unit is generated based on the extracted signal area.

Figure 8:
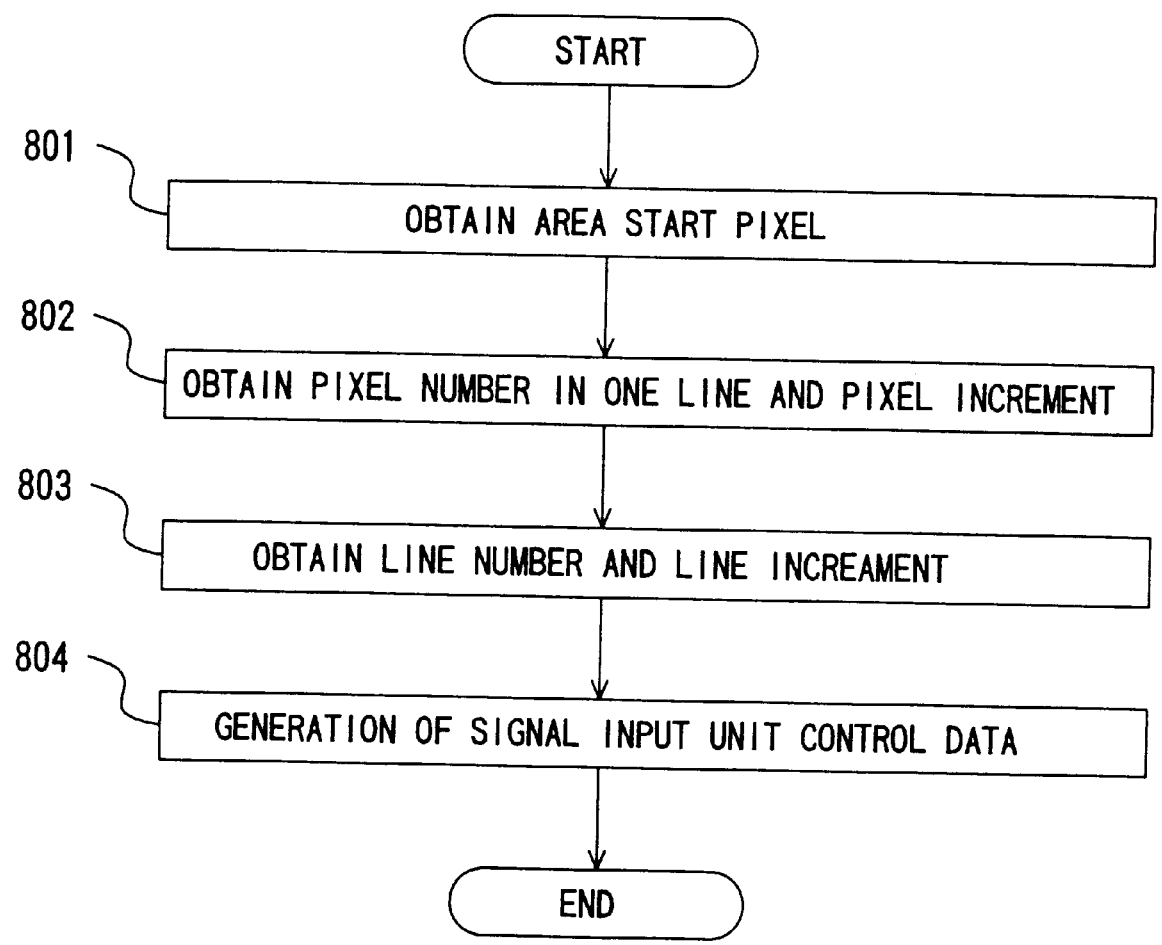
FIG. 8 is a flowchart for detailed processing in step 504 of FIG. 5.

The control data for the signal input unit in step 504 is generated in accordance with a flowchart of FIG. 8.

The flowchart of FIG. 8 will now be described in detail.

In step 801, an address of the start pixel in the signal area, which is (47, 107) in this embodiment, is fetched.

In step 802, the number of pixels in one line in the signal area and the interval with the adjacent pixel as an increment of the address are obtained. In this embodiment, the number of the pixels in one line and the increment are obtained as 374 and 1, respectively.

In step 803, the number of lines in one field of the signal area and the number of pixels between adjacent lines as an increment of the address between the lines are obtained. In this embodiment, the number of the lines and the increment are obtained as 516 and 47, respectively.

In step 804, the signal input unit control data is generated on the basis of the values obtained in the previous steps and the specification data of the signal input unit 101.

The specification data of the signal input unit 101 is data for controlling the signal input unit 101 and includes the number of built-in registers and the contents thereof.

FIGS. 9a and 9b show examples of the control data for the signal input unit 101.

The control data shown in FIG. 9a is used when the signal input unit includes a counter and several registers such as a register for an increment value so as to serve as an image input unit. In this data, the address of the pixel (47, 107) in the source image signal is set as an initial value of the counter, and the increment for the counter is set as 1. The repeating period is set as 374, i.e., one line, and the increment for the counter at the end of processing of each line is set as 47.

The control data shown in FIG. 9b is used as a control program using a high-level language such as C language. The initial value for a variable src is set as the address of the pixel (107, 47) in the source image signal, and the initial value for a variable dst is set as the address of a $port_{13}1$, which is one of the input ports of the image processing unit 102 of FIG. 1. In this program, the pixel data are transferred while increasing the variables src and dst by one. When the transfer of the data in one line is completed, 47 is added to the variable src so as to designate the address of the subsequent line and the variable dst is set as the start address of the $port_{13}1$.

In this embodiment, description is made with regard to the case where one control signal (the Y signal) is selected in the image signal. When a plurality of control signals (for example, the Y and C signals) are selected, the selection step 502, the signal area extraction step 503 and the signal input unit control data generation step 503 of FIG. 5 are successively executed with regard to each of the selected signals.

In this manner, according to Embodiment 1, a designer can generate control data for a signal input unit without sufficient knowledge on the control of the signal input unit merely by inputting a signal format as a diagram.

(Embodiment 2)

Figure 10:
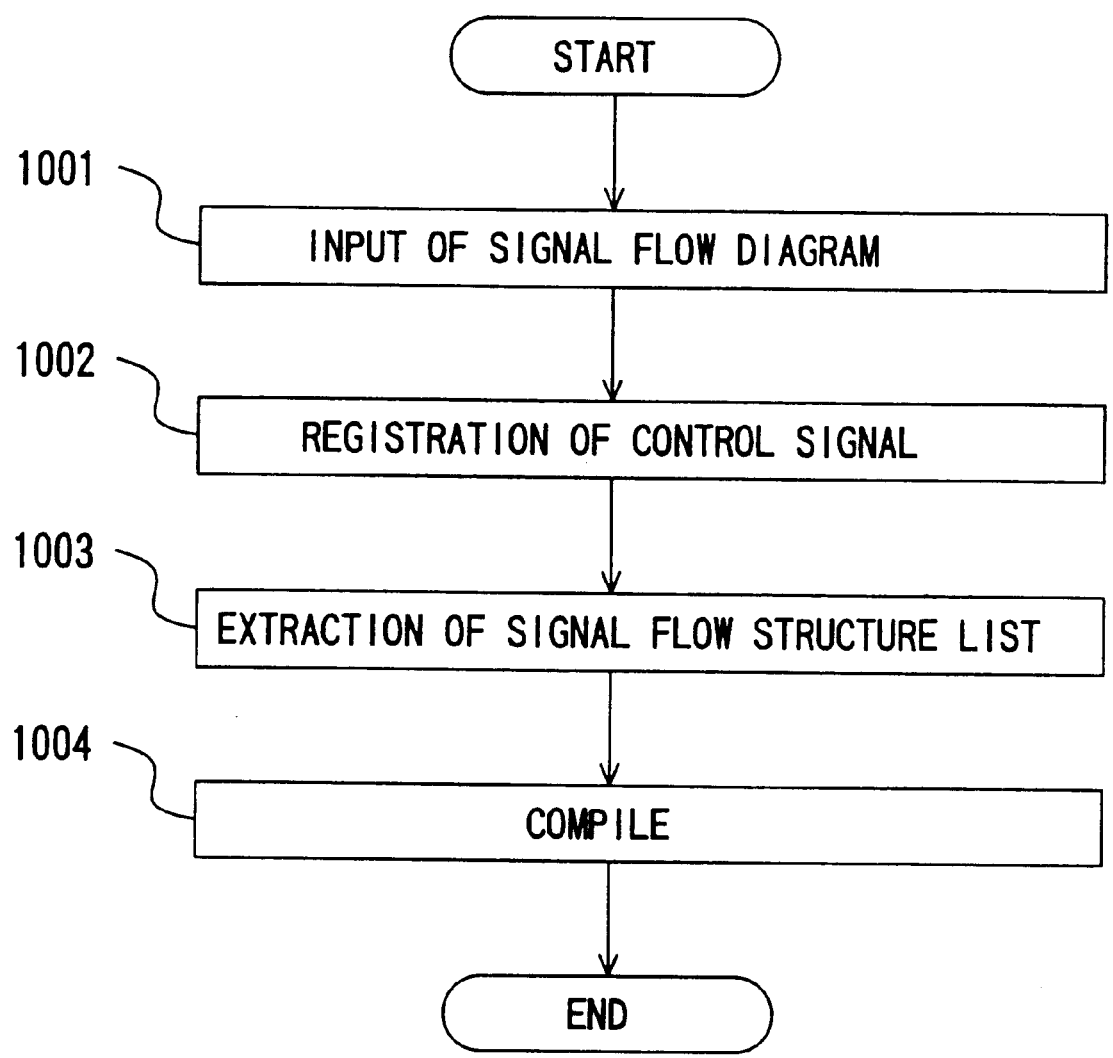
FIG. 10 is a flowchart for a main routine of a development supporting system for a signal processing system according to Embodiment 2 of the invention.

FIG. 10 is a flowchart for a development supporting method for an image processing system of this embodiment.

Figure 11:
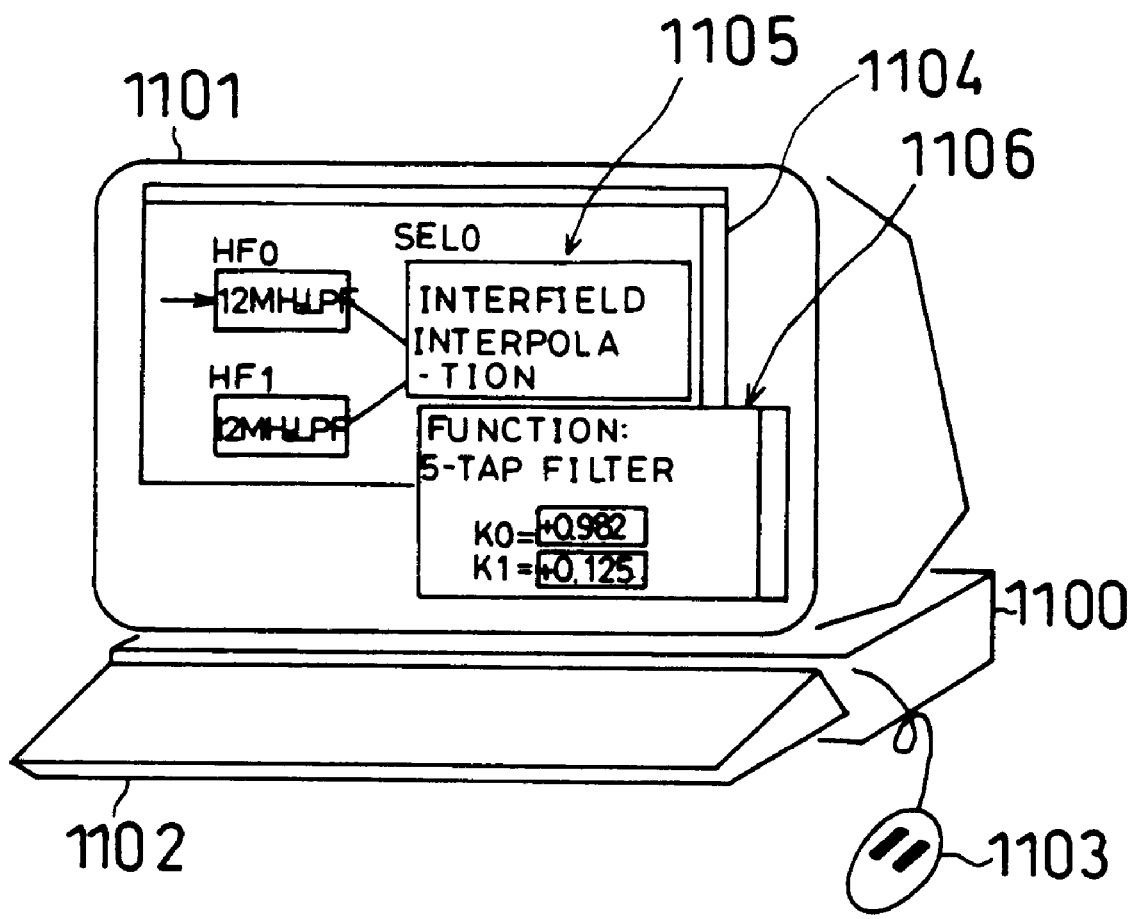
FIG. 11 is an explanatory diagram of the hardware configuration of the development supporting system for a signal processing system according to Embodiment 2 of the invention.

In step 1001 (flow input step), the designer inputs a function at level of processing algorithm of an image application to be developed as a signal flow diagram by using a functional diagram editor as is shown in FIG. 11.

The device of FIG. 11 comprises a central processor 1100, a monitor 1101, a keyboard 1102 and a mouse 1103. The monitor 1101 displays an execution screen 1104 of the functional diagram editor, in which a signal flow diagram 1105 and a function definition screen 1106 for defining a function of a processing block HF1 now being input are displayed.

FIG. 12 shows an example of the signal flow diagram 1105. A signal flow diagram is a diagram showing the processing of an image signal in conformity with the flow thereof.

In FIG. 12, blocks 1201 and 1202 are input ports, through which a source signal is input to the image processing system, for inputting a current field signal and a previous field signal, respectively.

Among image processing blocks shown in FIG. 12, blocks 1203 and 1204 are 12 MHz low-pass filter blocks, a block 1205 is an interfield interpolation block and a block 1206 is a frequency conversion block.

A block 1207 is an output port, through which an output signal resulting from the processing by the image processing system is output.

The respective processing blocks in FIG. 12 are provided with identification data (hereinafter referred to as the ID) of PORT0, PORT1, HF0, HF1, SEL0, HF2 and PORT2. These IDs are automatically provided to the blocks as identifiers by the present system.

Also in step 1001 of FIG. 10, the function of the signal processing module 105 is specified through the function definition screen 1106 of FIG. 11 at the same time of inputting the signal flow diagram. FIG. 13a shows description for the 12 MHz low-pass filter block 1203, and FIG. 13b shows description for the interfield interpolation block 1205. The 12 MHz low-pass filter block 1203 is a five-tap symmetrical filter. The interfield interpolation block 1205 is an interpolated selector for alternately outputting two lines of input pixels.

At this point, it is possible to describe the function by using an image control signal included in the image signal.

For example, the description of FIG. 13b is an example of the description including an image control signal, in which FSS indicates an image control signal corresponding to an interfield subsampling phasing signal and takes a value of one when a sampling point is right. An image control signal always follows a symbol of $. In the interfield interpolation block, when the signal FSS is 0, the block alternately outputs an input 0 (a current field signal) and an input 1 (a previous field signal) pixel by pixel in this order. When the signal FSS is 1, the block alternately outputs the input 1 and the input 0 pixel by pixel in this order.

Then, in step 1002 (registration step) of FIG. 10, the image control signal used in step 1001 for inputting the signal flow diagram and defining the function is registered. In this step, the name of the image control signal and the derivation method for its value are input.

An image control signal can be an image control signal included in a source signal or a signal derived from the image control signal (hereinafter referred to as the derived image control signal).

FIG. 14 shows an example of the registration (registration means 1400). In this example, an image control signal FSS is the 20th signal value of a Ctrl signal portion of a source signal, and an image control signal notFSS is a signal obtained as logical NOT of the control signal FSS.

Then, in step 1003 (structure data extraction step) of FIG. 10, a signal flow structure list is extracted from the signal flow diagram input in step 1001 as structure data of the diagram. This structure data extraction step 1003 and the flow input step 1001 together form a function input step.

FIG. 15 shows an example of the extracted signal flow structure list. A signal flow structure list is data for describing each processing block or input/output port in the following manner:

ID: Description of its function

Selection of an input block

The description in the first and second lines covers the input port PORT0, wherein the description "PORT0" in the first line indicates the ID of the processing block and "INPUT" indicates the function thereof.

The description "signal [0]" (which is indicated as "Y[0]" in this embodiment) in the second line indicates the input of data of the source signal corresponding to a currently processed pixel.

The description in the third and fourth lines covers the input port PORT1, wherein the description "PORT1" indicates the ID of the processing block, "INPUT" indicates the function thereof, and "signal [−748*516]" indicates the input of data of the source signal corresponding to a pixel preceding the currently processed pixel by 516*748 (=385968) pixels. In this case, 516 is the number of the lines in one field and 748 is the number of the pixels in one line, and hence, the data of the pixel preceding the currently processed pixel by 385968 pixels corresponds to the data of one field preceding the currently processed pixel. The data is input from a frame memory (not shown) which stores these data.

The description in the fifth to seventh lines covers the processing block HF0, wherein the description "HF0" in the fifth line indicates the ID of the processing block and "5TAP" indicates that the block is a five-tap symmetrical filter. The description in the sixth line indicates a coefficient of the filter, and the description "PORT0" in the seventh line indicates that the output of the block PORT0 is supplied to this processing block HF0 as an input. The description thereafter indicates similar data.

In step 1004 (image processing unit control data generation step) of FIG. 10, control data for the image processing unit is generated by using the signal flow structure list and the image control signal data registered in step 1002.

FIG. 16 is a flowchart for the image processing unit control data generation conducted in step 1004. The flowchart will now be described in detail.

In step 1601, the respective processing blocks are allocated to the signal processing modules 105. For convenience of the description in this embodiment, it is assumed that the 12 MHz low-pass filter block 1203 is allocated to signal processing modules VPE1 and VPE2 and that the interfield interpolation block 1205 is allocated to a signal processing module VPE3, wherein VPE1, VPE2 and VPE3 are identification data of the signal processing modules 105.

In step 1602 (generation step and connection data generation step) of FIG. 16, an assembler program, that is control data for the signal processing modules 105, and a connection list, that is connection data among the signal processing modules 105, are generated.

FIG. 17*a* through 17*d* show examples of the assembler program and the connection list.

FIG. 17*a* is an assembler program for the signal processing module VPE1.

The description "PROG$_{13}$HF$_{13}$1:" in the first line indicates the identification data corresponding to the name of the program.

The description "while (1)" in the second line indicates that the signal processing module VPE1 repeatedly executes processing sandwiched between "{" in the second line and "}" in the ninth line.

The description "if (CLK)" in the third line indicates that the signal processing module VPE1 executes processing sandwiched between "{" in the third line and "}" in the eighth line at the rising of a control clock signal CLK.

The description "1*d* 0, ALU" in the fourth line means to load 0 to an arithmetic logic unit ALU, i.e., to initialize the unit ALU.

The description "mul –0.232*DF [0]" in the fifth line indicates that the content of an internal register DF[0] is multiplied by –0.232 and the obtained product is added to the content of the unit ALU.

The description "mul +0.125*DF[1]" in the sixth line indicates that the content of an internal register DF[1] is multiplied by 0.125 and the obtained product is added to the content of the unit ALU.

The description "mul +0.982*DF[2]" in the seventh line indicates that the content of an internal register DF[2] is multiplied by 0.982 and the obtained product is added to the content of the unit ALU.

Similarly, FIG. 17*b* is an assembler program for the signal processing module VPE2.

Alternatively, an assembler program including the description of an image control signal can be generated. FIG. 17*c* shows an example of such an assembler program.

The program shown in FIG. 17*c* is an assembler program for the signal processing module VPE3, and includes the description using the image control signal FSS. In this case, the assembler program is not perfect, and is converted into a perfect assembler program through control signal substitution described below.

The program of FIG. 17*c* will now be described in detail.

The description "while (1)" in the second line indicates that the signal processing module VPE3 repeatedly executes processing sandwiched between "{" in the second line and "}" in the ninth line.

The description "if (CLK)" in the third line indicates that the signal processing module VPE3 executes processing sandwiched between "{" in the third line and "}" in the fifth line at the rising of a control clock signal CLK.

The description "1*d* DF[$FSS], ALU" in the fourth line indicates that the content of an internal register DF[$FSS] corresponding to the value of the image control signal FSS is loaded to the unit ALU. Specifically, when the control signal FSS is 0, the content of the internal register DF[0] is loaded, and when the control signal FSS is 1, the content of the internal register DF[1] is loaded.

The description "if (CLK)" in the sixth line indicates that the signal processing module VPE3 executes processing sandwiched between "{" in the sixth line and "}" in the eighth line at the rising of a control clock signal CLK.

The description "1*d* DF[1–$FSS], ALU" in the seventh line indicates that the content of the internal register DF[1] is loaded to the unit ALU when the control signal FSS is 0 and that the content of the internal register DF[0] is loaded to the unit ALU when the control signal FSS is 1.

FIG. 17*d* shows an example of the connection list.

The description "NETLIST:" in the first line is identification data for the connection list.

The description in the second to the seventh lines indicates the connecting relationship among the signal processing modules in the following manner:

Input identification data: output identification data

This means that an input defined by the input identification data is connected to an output defined by the output identification data.

The description in the second line indicates that the input 0 of the signal processing module VPE1 is connected to the output 0 of the signal processing module VPE0.

The third to the seventh lines are similarly described.

Through the aforementioned programs, the 12 MHz low-pass filter block is allocated to the signal processing modules VPE1 and VPE2 and conducts its own processing as is shown in FIG. 18*a*.

In steps 1603 to 1606 of FIG. 16, a control program for the image processing unit to be executed in the control unit 103 is generated.

FIG. 19 shows part of an exemplified control program for the image processing unit.

The control data is a program executed in the control unit 103 and includes (1) a portion for reading an image control signal from a source signal or for deriving a derived image control signal; (2) a portion for substituting the obtained image control signal in control data (i.e., an assembler program) for the image processing unit; (3) a portion for down loading a connection list to the image processing unit; and (4) a portion for down loading the control data (i.e., the assembler program) to the image processing unit.

In step 1603 (reading portion generation step) of FIG. 16, the image control signal included in the source signal is read based on the data of the image control signal registered in step 1002 of FIG. 10, and a derived image control signal is derived.

An example of the thus generated control data is shown in the first and second lines of FIG. 19. The control data of FIG. 19 is a program for controlling a signal input unit/signal processing module for MUSE decoding, and is executed field by field of an image signal. The first line of the program of FIG. 19 indicates that the image control signal FSS is obtained from the source signal as the 20th pixel value of the Ctrl signal portion. The description "GetCtrlData" indicates processing for controlling the signal input unit 101 so as to input the corresponding signal from the Ctrl signal portion of the source signal, and this processing forms an input portion 1901, which is a subroutine executed by the control unit 103. The second line indicates that the image control signal notFSS is obtained as a logical NOT value of the image control signal FSS. The symbol "!" means logical NOT.

In step 1604 (substituting portion generation step) of FIG. 16, in the case where the assembler program and the connection list generated in step 1602 include an image control signal, portions in the assembler program and the connection list that are described by using the name of the image control signal are substituted with an actual image control signal value, thereby completing the generation of the control data.

The third line of FIG. 19 shows an example of the completed control data.

The description "Translate (PROG$_{13}$SEL$_{13}$T, PROG$_{13}$SEL)" indicates processing for substituting a portion described by using the name of the image control signal in an assembler program PROG$_{13}$SEL$_{13}$T with an actual image control signal value so as to return the resultant program as an assembler program PROG$_{13}$SEL. This line forms a substituting portion 1902, which is another subroutine executed by the control unit 103.

The results of the substitution are shown in FIGS. 20a and 20b.

FIG. 20a shows the result of the substitution of the assembler program PROG$_{13}$SEL$_{13}$T shown in FIG. 17c when the image control signal FSS is 0. The description including the image control signal in the fourth and seventh lines of FIG. 17c is substituted with the description including the image control signal FSS with a value of 0.

Similarly, FIG. 20b shows the result of the substitution when the image control signal FSS is 1.

As is shown in FIGS. 18b and 18c, the interfield interpolation block is allocated to the signal processing module VPE3 so as to conducts its own processing.

In step 1605 of FIG. 16, control data is generated for down loading, to the bus switch 106, the connection list generated in step 1602 or the connection list obtained through the substitution in step 1604 when the connection list generated in step 1602 includes the description using an image control signal.

The fourth line of FIG. 19 shows an example of the thus generated control data.

The description "DownLoad (BUSSW, NETLIST)" means to down load the connection list NETLIST shown in FIG. 17d to a connection bus switch BUSSW. The description "DownLoad" indicates an instruction for down loading specified data to a specified portion of the image processing unit 102, which is still another subroutine executed by the control unit 103.

In step 1606 of FIG. 16, control data is generated for down loading, to the signal processing modules 105 of the image processing unit 102, the assembler program generated in step 1602 or the assembler program obtained through the substitution in step 1604 when the assembler program generated in step 1602 includes description using an image control signal.

The fifth, sixth and seventh lines of FIG. 19 show examples of the thus generated control data.

The description "DownLoad (VPE1, PROG$_{13}$HF$_{13}$1)" in the fifth line means to down load the assembler program PROG$_{13}$HF$_{13}$1 shown in FIG. 17a to the signal processing module VPE1, and this processing forms an output portion 1903.

The description "DownLoad (VPE2, PROG$_{13}$HF$_{13}$2)" in the sixth line means to down load the assembler program PROG$_{13}$HF$_{13}$2 shown in FIG. 17b to the signal processing module VPE2, and this processing also forms the output portion 1903.

The description "DownLoad (VPE3, PROG$_{13}$SEL)" in the seventh line means to down load the assembler program PROG$_{13}$SEL shown in FIGS. 20a and 20b to the signal processing module VPE3, and this processing also forms the output portion 1903.

Each of the signal processing modules VPE1, VPE2 and VPE3 corresponds to predetermined one of the plural signal processing modules 105 shown in FIG. 1.

In this manner, when the generated control data and the subroutines such as GetCtrlData, Translate and DownLoad are used, it is possible to control the image processing by the image processing unit 102.

The detailed description of the content of the subroutines such as GetCtrlData, Translate and DownLoad is herein omitted.

The image processing unit control data generation means 412 in the central processing unit 403 shown in FIG. 4 includes generation means, connection data generation means, reading portion generation means and substituting portion generation means respectively having functions as the generation step and connection data generation step 1602, the reading portion generation step 1603 and the substituting portion generation step 1604 of FIG. 16, although these means are not shown in FIG. 4.

As described above, the control unit 103 of this embodiment previously has an assembler program (control data) including an image control signal with a name of FSS as is shown in FIG. 17c. When an image signal is supplied to the signal input unit 101, the image control signal FSS included in the image signal is read in the control unit 103 so as to fetch an actual value (content) of the image control signal FSS. Then, the actual value of the image control signal FSS is substituted with the name of the image control signal FSS included in the control data shown in FIG. 17c, thereby obtaining complete control data through the substitution as is shown in FIGS. 20a and 20b. Therefore, when the control data obtained through the substitution is down loaded to the signal processing modules VPE1, VPE2 and VPE3, the signal processing modules VPE1, VPE2 and VPE3 respectively process the image signal in accordance with the content of the image control signal included in the down loaded control data.

Although the description is made with regard to image processing hardware including, in an image processing unit, a DSP for executing signal processing by an assembler program in this embodiment, it is possible to apply this embodiment to image processing hardware including an image processing circuit controlled by a control signal.

Thus, according to Embodiment 2, image processing control data for controlling image processing by using an image control signal can be simply generated by describing a signal flow diagram and the functions of processing blocks in the signal flow diagram by using the image control signal.

(Embodiment 3)

Figure 21:
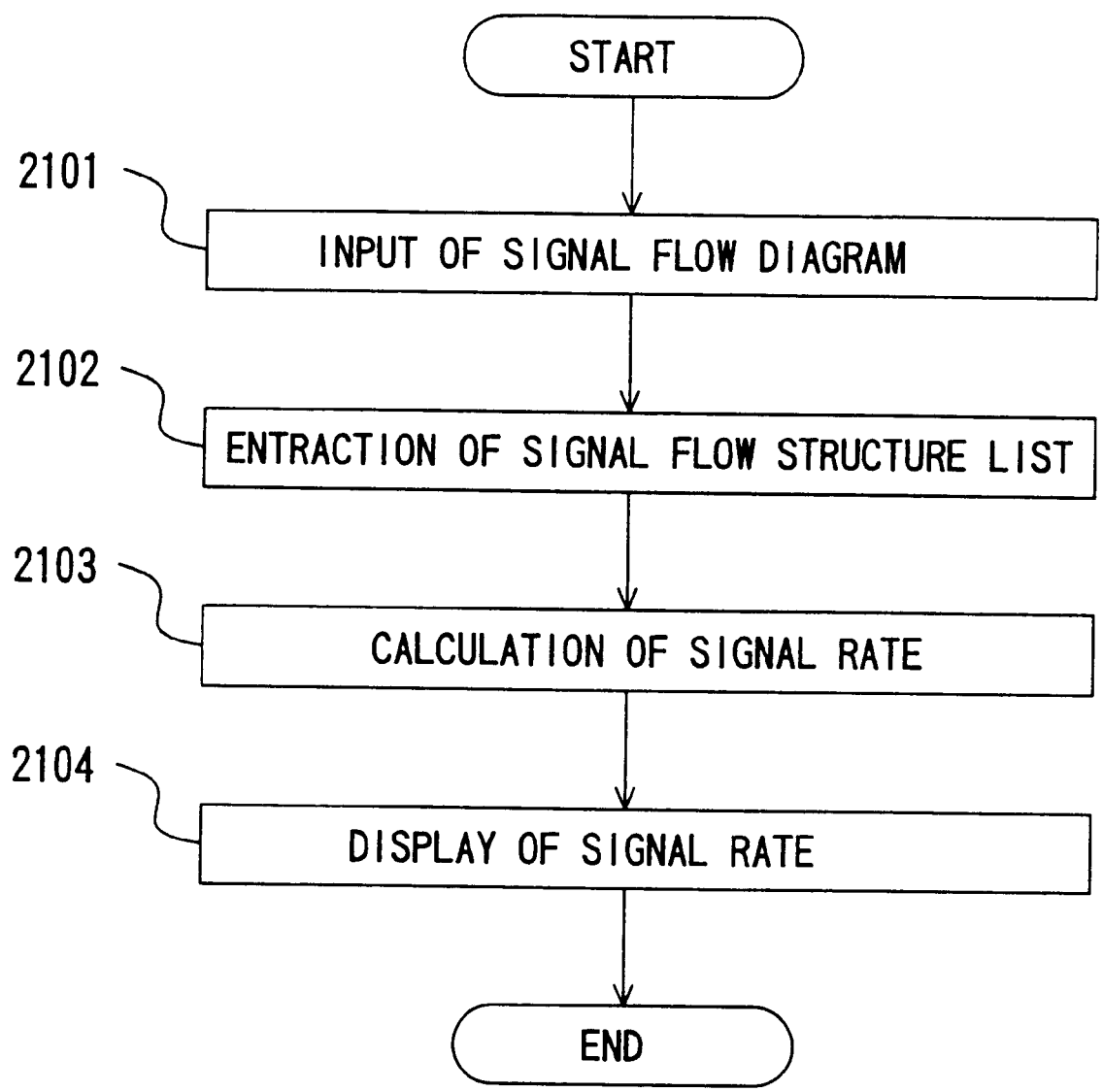
FIG. 21 is a flowchart for a main routine of a development supporting system for a signal processing system according to Embodiment 3 of the invention.

FIG. 21 is a flowchart for a development supporting system for an image application according to this embodiment. This flowchart is to be added to Embodiment 1 or 2, wherein in step 2101 (flow input step) the designer inputs the function of an image application to be developed at level of processing algorithm as a signal flow diagram by using a functional diagram editor as is shown in FIG. 11.

In step 2102 (structure data extraction step), signal flow structure data is extracted from the signal flow diagram input in step 2101. FIG. 15 shows an example of the extracted signal flow structure data.

Then in step 2103 (calculation step), an output signal rate of each signal processing module 105 is calculated based on the function of the signal processing module 105 and its input signal rate.

For example, the input ports PORT0 and PORT1 are blocks for inputting one line of a Y signal portion of a source signal, and hence, the output signal rate of these blocks is 748 (pixel/line) equally to the input signal rate.

The image processing blocks HF0 and HF1 are five-tap symmetrical filters, and hence, the output signal rate is 748 (pixel/line) equally to the input signal rate.

The image processing block SEL0 is a two-input interpolation selector, and hence, the output signal rate is twice as much as the input signal rate, namely, 1496 (pixel/line).

The image processing block HF2 is a frequency converter from a frequency of 32 MHz to 24 MHz, and hence, the output signal rate is 24/32 times as much as the input signal rate, namely, 1122 (pixel/line).

Then in step 2104 (display step), the output signal rate obtained in step 2103 is displayed on the screen of the functional diagram editor 1104.

Figure 22:
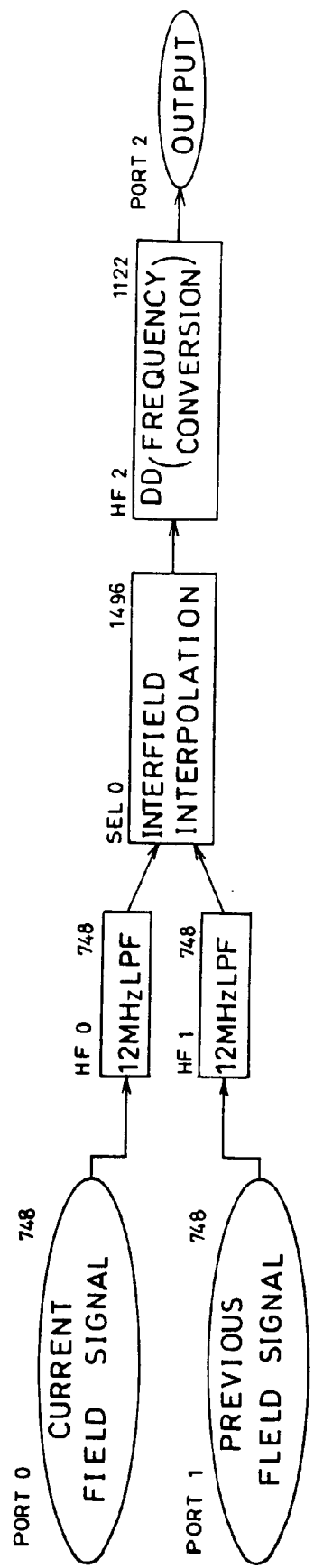
FIG. 22 is an exemplified signal flow diagram with signal rates.

FIG. 22 is an example of the display of the output signal rate. Each processing block is provided with its output signal rate on the upper right side.

The central processing unit 403 of FIG. 4 includes calculation means and display means having functions as the calculation step 2103 and the display step 2104 of FIG. 21, although these means are not shown in FIG. 4.

In this manner, Embodiment 3 enables the designer to develop control data for the signal input unit 101 and the signal processing modules 105 without always paying attention to a signal rate because the signal rate of each image processing block is calculated and displayed on the screen.

Although Embodiment 3 is described as additional processing to Embodiment 1 or 2, it is possible to add Embodiment 3 to Embodiment 4 described below.

(Embodiment 4)

Figure 23:
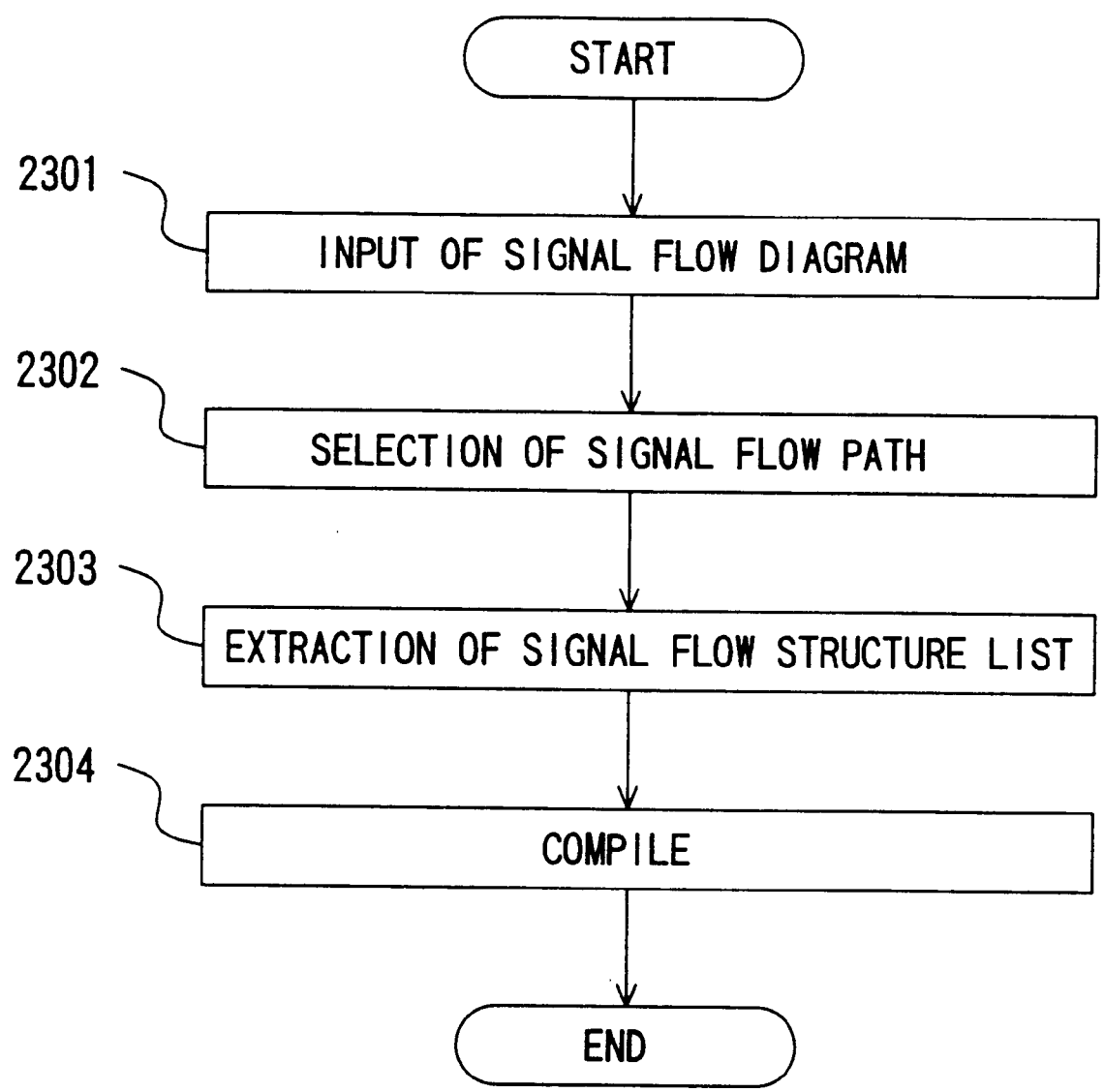
FIG. 23 is a flowchart for a main routine of a development supporting system for an image processing system according to Embodiment 4 of the invention.

FIG. 23 is a flowchart for a development supporting system for an image processing application according to this embodiment.

In step 2301 (flow input step) of FIG. 23, the designer inputs the function of an image application to be developed at level of processing algorithm as a signal flow diagram by using a functional diagram editor as is shown in FIG. 11.

FIG. 24 is an example of the signal flow diagram. In this signal flow diagram, a plurality of signal paths are formed between predetermined two image processing blocks.

Blocks 2401, 2402, 2403, 2404, 2405, 2406 and 2407 of FIG. 24 correspond to the blocks 1201, 1202, 1203, 1204, 1205, 1206 and 1207 of FIG. 12, respectively.

Blocks 2408 and 2409 of FIG. 24 are frequency conversion blocks as the block 2406.

A block 2410 of FIG. 24 is an interfield interpolation block as the block 2405.

The functions of the respective blocks are input at the time of inputting the signal flow diagram as shown in the function selection screen 1106 of FIG. 11.

Black rhombuses referred to with a reference numeral 2411 in FIG. 24 indicate exclusive selection among a plurality of signal paths between the 12 MHz low-pass filter 2403 and the output port 2407 and among a plurality of signal paths between the other 12 MHZ low-pass filter 2404 and the output port 2407, and indicate that optional one of the plurality of signal paths is selected in a path selection step 2302 described below.

In step 2302 (path selection step) of FIG. 23, the designer selects optional one of the plurality of signal paths. In this embodiment, a pointer cursor is moved to each processing block on the functional diagram editor 1104 by using the mouse 1103, where the mouse button is clicked.

Figure 25:
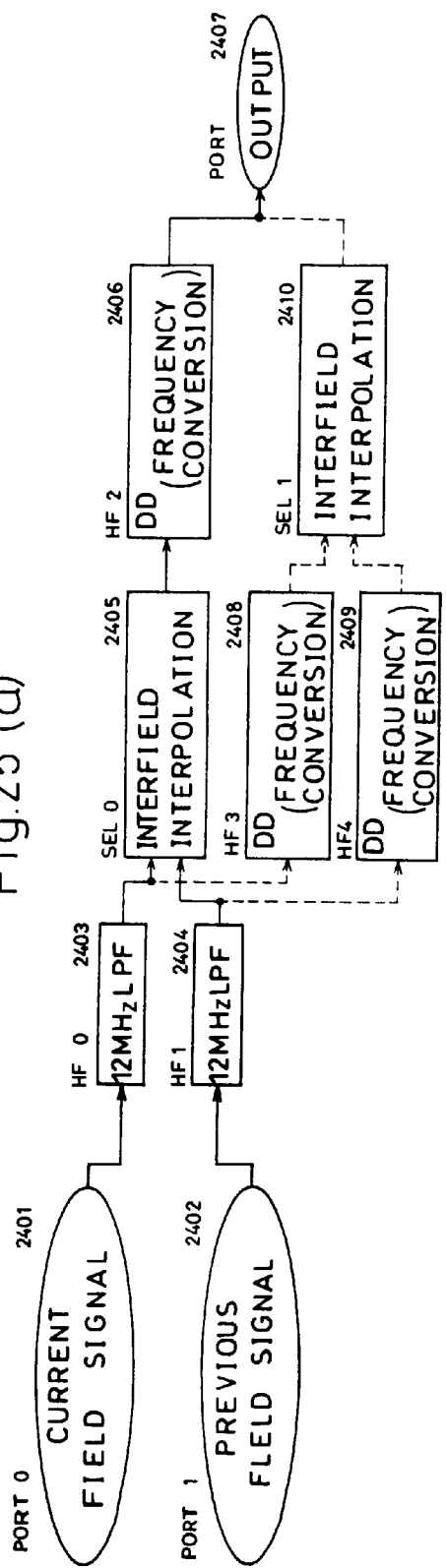
FIG. 25a is an exemplified signal flow diagram in which one path is selected among a plurality of signal paths.
FIG. 25b is an exemplified signal flow diagram in which another path is selected among the plurality of signal paths.
Figure 25:
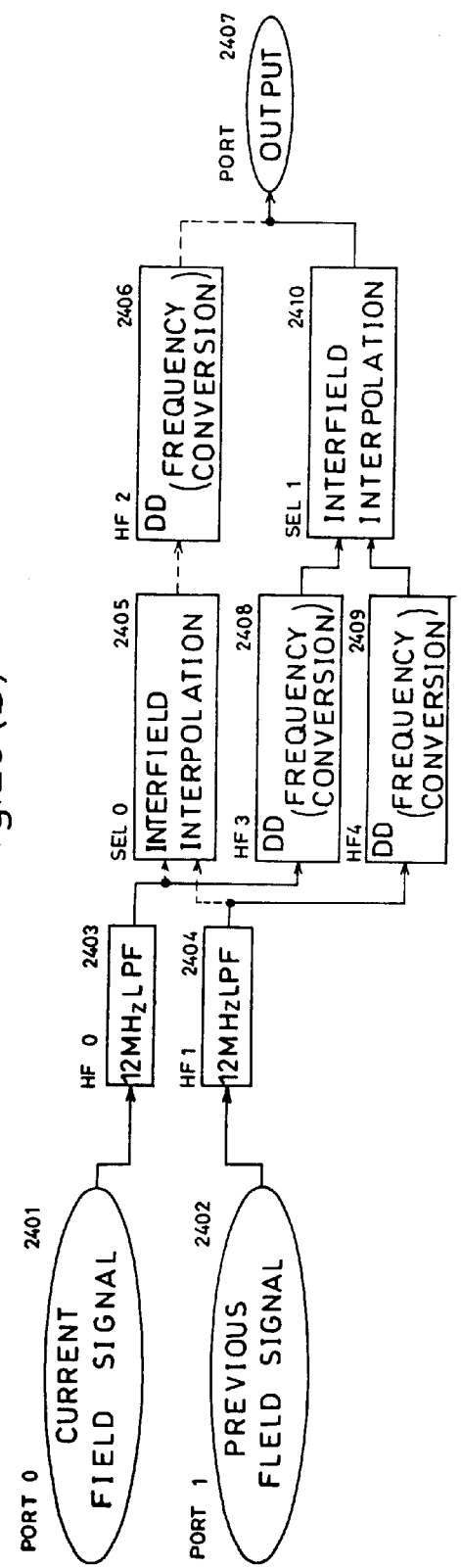

FIG. 25a shows an example of the signal flow diagram in which the path selection is completed. In FIG. 25, a selected path is indicated with a solid line, and an unselected path is indicated with a broken line.

In the signal flow diagram of FIG. 25a, paths extending from the blocks HF0 and HF1 to the block SEL0 are selected, and paths extending from the block HF0 to the block HF3, from the block HF1 to the block HF4, from the blocks HF3 and HF4 to the block SEL1 are not selected.

Then in step 2303 (structure data extraction step) of FIG. 23, a signal flow structure list is extracted from the signal flow diagram. At this point, a signal flow structure list is extracted with regard to merely the selected path when the signal flow diagram includes a plurality of paths.

FIG. 26a shows an example of the signal flow structure list extracted from the signal flow diagram of FIG. 25a. This signal flow structure list is similar to the structure list of FIG. 15.

FIG. 25b shows another example of the signal flow diagram. This signal flow diagram is obtained when the unselected paths in FIG. 25a are selected instead in the signal flow diagram of FIG. 24. FIG. 26b shows an example of the signal flow structure list extracted from the signal flow diagram of FIG. 25b.

In step 2304 (image processing unit control data generation step) of FIG. 23, control data for the image processing unit is generated by using the signal flow structure list. This processing is conducted in the same manner as in step 1004 of Embodiment 2.

In this manner, according to Embodiment 4, a plurality of image processing algorithm are described as a plurality of signal flow paths during the examination of the image processing algorithm by the designer, and one of the signal flow paths is selected to generate control data. As a result, there remains a record of the examination of the algorithm, which makes it easy to maintain the development work.

(Embodiment 5)

FIG. 27 is a block diagram of a development supporting device for an image processing system according to this embodiment.

The device of FIG. 27 comprises signal format input means 2701 by which the designer inputs the format of a source signal as a diagram. The designer inputs the format of an object image signal as is shown in FIG. 3.

The signal format input by the designer is stored in signal format data memory means 2702 in the form of the signal format data shown in FIG. 7

The device further comprises signal flow diagram input means 2705 by which the designer inputs a signal flow diagram corresponding to the algorithm of an image processing application and the function of each block.

An example of the signal flow diagram is shown in FIG. 12.

Examples of function definition of the blocks in the signal flow diagram are shown in FIGS. 13a and 13b. The data of the signal flow diagram is stored in signal flow diagram data memory means 2706.

FIG. 28 shows an example of the signal flow diagram data. The signal flow diagram data of FIG. 28 includes data of each block in the following manner:

| Identification data: |
| --- |
| (Graphic data list) |
| (Function data list) |
| (Connection data list) |

The description in the first to fourth lines of FIG. 28 covers the data of an image processing block 1201, wherein the description "PORT0" in the first line indicates the identification data of the image processing block 1201.

The description "(OVAL, 0, 30, 15, 35)" in the second line indicates that the image processing block has a shape of an ellipse in the signal flow diagram with the coordinate (0, 30) as the upper left apex, a width of 35 and a length of 15.

The description "(INPUT, Y, 0)" in the third line indicates that the image processing block PORT0 has a function as an input port for inputting data of a Y signal in a currently processed line in a currently processed field.

The description "(SOURCE$_{13}$SIGNAL)" in the fourth line indicates the identification data of an image processing block for supplying data to the image processing block PORT0 and indicates that the image processing block PORT0 receives a source signal as an input.

The description in the fifth to eighth line of FIG. 28 covers the data of an image processing block 1203, wherein the description "HF0" in the fifth line indicates the identification data of the image processing block 1203. The description "(BOX, 50, 30, 15, 35)" in the sixth line indicates that the image processing block 1203 has a shape of a square in the signal flow diagram with a coordinate (50, 30) as the upper left apex, a width of 35 and a length of 15.

The description "(HF, 5TAP, 0.982, 0.125, -0.232)" in the seventh line indicates that the image processing block 1203 has a function as a symmetrical 5-tap horizontal filter having filter coefficients of 0.982, 0.125 and -0.232.

The description of "(PORT0)" in the eighth line indicates the identification data of an image processing block for supplying data to the image processing block HF0, and indicates that the image processing block HF0 receives the output of the processing block PORT0 as an input.

The description in the ninth and thereafter indicates similar data.

When there are a plurality of signal flows for realizing algorithm or there are a plurality of possible algorithm, it is possible to indicate a plurality of algorithm in the signal flow diagram as a plurality of signal flow paths and to input the plurality of signal flow paths. FIG. 24 shows an example of such a signal flow diagram.

The device of FIG. 27 further comprises signal path selection means 2707 by which the designer selects one of the plural signal flow paths.

The device further comprises signal flow structure list extraction means 2708 for extracting a signal flow structure list from the signal flow diagram input by the designer by using the signal flow diagram input means 2705. At this point, when the signal flow diagram includes a plurality of signal flow paths, a signal flow structure list is extracted with regard to merely the signal flow path selected by using the signal path selection means 2707.

Examples of the signal flow structure list are shown in FIGS. 15, 26a and 26b.

The signal flow structure list of FIG. 15 is extracted from the signal flow diagram of FIG. 12.

The signal flow structure lists of FIGS. 26a and 26b are extracted from the signal flow diagrams of FIGS. 25a and 25b, respectively.

The device of FIG. 27 further comprises control signal registration means 2710 by which the designer registers the name of and the derivation method for an image control signal used for defining the signal flow diagram and the function thereof. An image control signal is a control signal included in a source signal or a derived image control signal.

The data of the registered control signal is stored in control signal data memory means 2711 in a manner as shown in FIG. 14.

The device of FIG. 27 further comprises signal area extraction means 2703 for reading the data of the signal format from the signal format data memory means 2702 and reading the name of the signal to be input from the signal flow structure list extraction means 2708, thereby extracting the signal area of the selected signal.

In this embodiment, the input port 1201 is a port for inputting a Y signal portion of a source signal, and hence, input unit control data for inputting a Y signal is required. Therefore, the signal area extraction means 2703 reads Y as the name of the signal to be input.

The device further comprises signal input unit control data generation means 2704 for reading the area data of the signal to be input from the signal area extraction means 2703 and reading the input port data of the signal to be input to the image processing unit from the signal flow structure list extraction means 2708, thereby generating control data for the signal input unit.

In this embodiment, the data in the first line of FIG. 7 is read as the area data of the object signal and the block PORT0 is read as the input port data.

A flowchart for the processing by the signal input unit control data generation means 2704 is shown in FIG. 8.

Examples of the signal input unit control data are shown in FIGS. 9a and 9b.

The device further comprises image processing unit control data generation means 2709 for reading the signal flow structure list from the signal flow structure list extraction means 2708 and reading the image control signal data from the control signal data memory means 2711, thereby generating control data for the image processing unit.

A flowchart for the processing by the image processing unit control data generation means 2709 is shown in FIG. 16.

Examples of the image processing unit control data are shown in FIGS. 19 and 17a through 17d.

When a plurality of signals are to be input, the signal area extraction means 2703 and the signal input unit control data generation means 2704 conduct their processing a plurality of times.

The signal area extraction means 2703 can read the signal format data directly from the signal format input means 2701 instead of the signal format data memory means 2702.

Also, the signal path selection means 2707 or the signal flow structure list extraction means 2708 can read the signal flow diagram data from the signal flow diagram input means 2701 instead of the signal flow diagram data memory means 2706.

The image processing unit control data generation means 2709 can read the image control signal data from the control signal registration means 2710 instead of the control signal data memory means 2711. In addition, the image processing unit control data generation means 2709 can include the control signal data memory means 2711 and the control signal registration means 2710.

In this manner, Embodiment 5 enables the designer to generate control data for a signal input unit without detailed knowledge on the control of the signal input unit, by inputting a signal format as a diagram.

Furthermore, since the signal flow diagram and the function of each processing block in the signal flow diagram are described by using an image control signal, control data for the image processing unit for controlling the image processing by using the image control signal can be easily generated.

Additionally, there is no need for the designer to always pay attention to a signal rate during the development because the signal rate of each image processing block is obtained and displayed.

Furthermore, a plurality of image processing algorithm are described as a plurality of signal flow paths during the examination of the image processing algorithm by the designer, and one of the signal flow paths is selected so as to generate control data. As a result, there remains a record of the examination of the algorithm, which makes it easy to maintain the development work.

What is claimed is:

1. A development supporting device for developing control data in a signal processing system that receives an object signal including a control signal and includes a signal processing unit conducting signal processing on the object signal based on the function thereof, the control data to be developed being composed of control program for controlling the operation associated with the function of the signal processing unit, comprising:

function input means for inputting function data of the signal processing unit, the function data being described partially by using a predetermined title of the control signal included in the object signal;

registration means for having derivation data of contents of the control signal registered therein; and signal processing unit control data generation means for generating control data for the signal processing unit on the basis of the function data input by the function input means and the derivation data of contents of the control signal registered in the registration means.

2. The development supporting device of claim of 1, further comprising:

signal format input means for inputting a format of the object signal including a plurality of control signals;

selection means for selecting part of or all the control signals included in the object signal;

signal area extraction means for extracting a signal area occupied by the control signal selected by the selection means in the format input by the signal format input means; and signal input unit control data generation means for generating control data for a signal input unit of the signal processing system on the basis of the signal area extracted by the signal area extraction means.

3. The development supporting device of claim 2, wherein the function input means comprises:

flow input means for inputting algorithm for the signal processing and a function of a signal processing unit used for the signal processing as a signal flow diagram which shows flow of the object signal; and structure data extraction means for extracting structure data from the signal flow diagram input by the flow input means, and the signal processing unit control data generation means for generating control data for the signal processing unit on the basis of the structure data extracted by the structure data extraction means and the derivation data of the control signal registered in the registration means.

4. The development supporting device of claim 1, wherein the function input means comprises:

flow input means for inputting algorithm for the signal processing and a function of a signal processing unit used for the signal processing as a signal flow diagram which shows flow of the object signal; and structure data extraction means for extracting structure data from the signal flow diagram input by the flow input means, and the signal processing unit control data generation means for generating control data for the signal processing unit on the basis of the structure data extracted by the structure data extraction means and the derivation data of the control signal registered in the registration means.

5. The development supporting device of claim 1, further comprising:

flow input means for inputting algorithm for the signal processing and functions of a plurality of signal processing units used for the signal processing as a signal flow diagram which shows flow of the object signal;

structure data extraction means for extracting structure data from the signal flow diagram;

calculation means for calculating a signal rate of each of the signal processing units on the basis of the structure data extracted by the structure data extraction means; and display means for displaying the signal rate calculated by the calculation means.

6. A development supporting device for developing control data in a signal processing system that receives an object signal and includes a plurality of signal processing units, each conducting signal processing on the object signal based on each function thereof, the control data to be developed being composed of control program for controlling the operation associated with the function of the signal processing unit, comprising:

flow input means for inputting algorithm for the signal processing and functions of the plurality of signal processing units used for the signal processing as a signal flow diagram which shows flow of the object signal and includes plural signal paths that connect predetermined two of the signal processing units;

path selection means for selecting one of the plural signal paths between the predetermined two signal processing units in the signal flow diagram:

structure data extraction means for extracting structure data from the signal flow diagram input by the flow input means excluding the signal paths that are not selected by the path selection means; and signal processing unit control data generation means for generating control data for the signal processing units on the basis of the structure data extracted by the structure data extraction means.

7. The development supporting device of claim 6, further comprising:

flow input means for inputting algorithm for the signal processing and functions of a plurality of signal processing units used for the signal processing as a signal flow diagram which shows flow of the object signal;

structure data extraction means for extracting structure data from the signal flow diagram;

calculation means for calculating a signal rate of each of the signal processing units on the basis of the structure data extracted by the structure data extraction means; and display means for displaying the signal rate calculated by the calculation means.

* * * * *